(12) United States Patent
Yoneda et al.

(10) Patent No.: US 8,741,461 B2
(45) Date of Patent: Jun. 3, 2014

(54) BATTERY PACK HAVING WATERPROOF STRUCTURE

(75) Inventors: Haruhiko Yoneda, Sumoto (JP);
Masami Haino, Minamiawaji (JP);
Hironori Ogura, Anjo (JP); Toru Yamada, Anjo (JP)

(73) Assignees: Sanyo Electric Co., Ltd., Osaka (JP);
Makita Corporation, Aichi (JP)

( * ) Notice: Subject to any disclaimer, the term of this patent is extended or adjusted under 35 U.S.C. 154(b) by 188 days.

(21) Appl. No.: 13/212,458

(22) Filed: Aug. 18, 2011

(65) Prior Publication Data

US 2012/0045667 A1     Feb. 23, 2012

(30) Foreign Application Priority Data

Aug. 20, 2010    (JP) ................................. 2010-184809

(51) Int. Cl.
| | |
|---|---|
| *H01M 2/10* | (2006.01) |
| *H04M 1/02* | (2006.01) |
| *H01M 2/30* | (2006.01) |
| *H01M 10/42* | (2006.01) |
| *H01M 2/36* | (2006.01) |

(52) U.S. Cl.
CPC .......... *H01M 2/1055* (2013.01); *H01M 2/1044* (2013.01); *H04M 1/0252* (2013.01); *H01M 2/1022* (2013.01); *H01M 2/30* (2013.01); *H01M 10/42* (2013.01); *H01M 2/36* (2013.01); *Y02E 60/12* (2013.01)
USPC ................. 429/97; 429/96; 429/99; 429/100; 429/138; 429/176

(58) Field of Classification Search
CPC ..... H01M 10/42; H01M 2/1055; H01M 2/30; H01M 2/36; H01M 1/1022; H01M 1/1044; H04M 1/02552; Y02E 60/12
USPC ........................ 429/96, 97, 99, 100, 138, 176
See application file for complete search history.

(56) References Cited

U.S. PATENT DOCUMENTS

| | | | |
|---|---|---|---|
| 2009/0085514 A1 | 4/2009 | Mizoguchi et al. | |
| 2010/0248016 A1* | 9/2010 | Hanawa et al. | ............... 429/178 |

FOREIGN PATENT DOCUMENTS

| | | |
|---|---|---|
| CN | 101399385 | 4/2009 |
| JP | 2001-155700 | 6/2001 |

(Continued)

OTHER PUBLICATIONS

Extended European Search Report (in English language) issued Dec. 23, 2011 in corresponding European Patent Application No. 11 00 6770.

(Continued)

*Primary Examiner* — Patrick Ryan
*Assistant Examiner* — Ben Lewis
(74) *Attorney, Agent, or Firm* — Wenderoth, Lind & Ponack, LLP

(57) ABSTRACT

A battery pack includes terminals (33) and a lock hook (37*b*). The terminals (33) are fastened onto a circuit board (74) and connected to rechargeable batteries (39). The terminals are exposed externally of a casing (31). The hook (37*b*) protrudes from a surface of the casing (31), and holds the battery pack on a charger (100). A hook opening window (24) is open in one of the surfaces of the casing. The hook (37*b*) can protrude from the surface of the casing (31). A drain hole (28) is open in another surface of the casing. A partition rib (25) is arranged between a path and an electronic circuit. The path is separated from the circuit. The path extends inside the casing (31) from the window (24). The circuit is mounted on the board (74). The window (24) communicates with the hole (28) through the path.

13 Claims, 24 Drawing Sheets

(56) References Cited

FOREIGN PATENT DOCUMENTS

| JP | 2006-134801 | | 5/2006 | |
| JP | 2006-196277 | | 7/2006 | |
| JP | 2006-205284 | * | 8/2006 | ................ B25F 5/00 |
| JP | 2007-280679 | | 10/2007 | |
| JP | 2009-60165 | | 3/2009 | |
| JP | 2009-212583 | | 9/2009 | |
| WO | 2009/057809 | | 5/2009 | |

OTHER PUBLICATIONS

Office Action issued Jan. 6, 2014 in corresponding Chinese patent application No. 201110236745.4.

* cited by examiner

BATTERY PACK HAVING WATERPROOF STRUCTURE

BACKGROUND OF THE INVENTION

1. Field of the Invention

The present invention relates to a battery pack which is detachably attached to electric equipment such as an electric tool and supplies electric power to the electric equipment.

2. Description of the Related Art

Electric equipment such as an electric tool includes a battery pack which includes a rechargeable battery and is detachably attached to the main unit of the electric equipment. Such electric equipment is useful as a cordless-type tool in construction sites and the like. Since the battery pack can be detached from the main unit of the electric equipment, the detached battery pack can be attached to a charger so that the battery pack is charged. Thus, the battery pack can be repeatedly used. A charger for charging this type of battery pack has been in practical use and includes an attachment portion that is arranged on the upper surface of the charger case and detachably holds the battery pack. Charging terminals are exposed from the attachment portion. In this charger, external connection terminals of the battery pack are connected to the charging terminals when the battery pack is attached to the attachment portion so that charging power is supplied through the charging terminals to charge the battery pack (see Laid-Open Patent Publication No. JP 2007-280679 A).

Also, the battery pack has a lock structure that holds the battery pack on the attachment portion of the charger for preventing the battery pack from being detached from the attachment portion. For example, as shown in FIG. 30, the lock structure can include a hook-shaped lock hook 97 that protrudes from the battery pack 90 and can engage with a lock opening 93 arranged in the attachment portion 92 thereby preventing detachment of the battery pack 90. Accordingly, the battery pack 90 includes a spring that biases the lock hook 97 in the protruding direction. When users press the lock hook 97 with their finger, the lock hook 97 can be disengaged from the lock opening. The battery pack 90 has a structure that allows the lock hook 97 to protrude/retract from/into the battery pack.

See also Laid-Open Patent Publication Nos. JP 2009-212583 A and JP 2009-60165 A.

On the other hand, if water comes into the battery pack, the terminals of the rechargeable battery or the electronic circuit may be short-circuited. For this reason, the battery pack preferably has a waterproof structure. However, since the battery pack has the movable part in the lock structure, it is not easy to provide a completely waterproof structure in the battery pack. In particular, since the lock hook is required to move, the opening is necessarily formed so as to allow the lock hook to protrude. For this reason, there is a problem that water may come into the casing of the battery pack through this opening. In addition, if water enters the battery pack, it is not easy to drain the water from the battery pack. The water may move to the rechargeable battery or the electronic circuit board, and may cause unintended electric conduction.

Also, the battery pack has an opening that is arranged in a part where the output terminals are arranged for connection to the electric equipment or the like. Thus, the output terminals are exposed through the opening externally of the battery pack. There is also a problem that water may come into the case through this opening.

The present invention is devised to solve the above problems. It is a main object to provide a reliable battery pack having an improved waterproof structure.

SUMMARY OF THE INVENTION

To achieve the above object, a battery pack according to a first aspect of the present invention can be attached to electric equipment and a charger 100, and includes a plurality of rechargeable batteries 39, a battery holder 70, a pack circuit board 74, a casing 31, external connection terminals 33 and a lock hook 37b. The electric equipment can be supplied with electric power from the rechargeable batteries. The charger 100 can charge the rechargeable batteries of the battery pack. The plurality of rechargeable batteries can supply electric power to the electric equipment. The battery holder 70 holds the rechargeable batteries 39. The pack circuit board 74 includes an electronic circuit connected to the rechargeable batteries 39. The casing 31 accommodates the battery holder 70 and the pack circuit board 74. The external connection terminals 33 are fastened onto the pack circuit board 74, and are connected to the rechargeable batteries 39. The external connection terminals are exposed externally of the casing 31. The lock hook 37b protrudes from a surface of the casing 31, and holds the battery pack with the battery pack being attached to the charger 100 and/or the electric equipment. A hook opening window 24 is opened in one of the surfaces of the casing so that the lock hook 37b can protrude from the surface of the casing 31. A partition rib 25 extends inside the casing 31 along the hook opening window 24 for the lock hook 37b. The edge of the partition rib 25 contacts the pack circuit board 74. In accordance with this construction, since the partition rib contacts only a part of the pack circuit board, it is possible for water to enter a part inside the pack circuit board.

In addition, a battery pack according to a second aspect of the present invention can further include terminal ribs 26 that extend inside the casing 31 to enclose the external connection terminals 33. The edges of the external connection terminals 33 contact the pack circuit board 74.

Also, a battery pack according to a third aspect of the present invention can be attached to a charger 100, and includes a plurality of rechargeable batteries 39, a battery holder 70, a pack circuit board 74, a casing 31, external connection terminals 33 and a lock hook 37b. The charger 100 can charge the rechargeable batteries of the battery pack. The battery holder 70 holds the rechargeable batteries 39. The pack circuit board 74 includes an electronic circuit connected to the rechargeable batteries 39. The casing 31 accommodates the battery holder 70 and the pack circuit board 74. The external connection terminals 33 are fastened onto the pack circuit board 74 and are connected to the rechargeable batteries 39. The external connection terminals are exposed externally of the casing 31. The lock hook 37b protrudes from a surface of the casing 31, and holds the battery pack with the battery pack being attached to the charger 100. A hook opening window 24 is opened in one of the surfaces of the casing so that the lock hook 37b can protrude from the surface of the casing 31. A drain hole 28 is opened in another surface of the casing other than the one of the surfaces on which the hook opening window 24 is opened. A partition rib 25 is arranged between a path and the electronic circuit so that the path is separated from the electronic circuit. The path extends inside the casing 31 from the hook opening window 24 and communicates with the hook opening window 24. The electronic circuit is mounted in the pack circuit board 74. The hook opening window 24 communicates with the drain hole 28 through the communication path, which is formed by the partition rib 25. According to this construction, even if water enters the battery pack through the hook opening window, the partition rib can prevent the water from flowing toward the electronic circuit, which is mounted on the pack circuit board. In addition, the water is guided to the drain hole after entering the battery pack. Therefore, it is possible to effectively prevent unintended electric conduction.

In addition, in a battery pack according to a fourth aspect of the present invention, the communication path can be formed at least partially on the upper surface of the battery holder 70. According to this construction, since the communication path can be formed on the back surface of the battery holder, which accommodates the rechargeable batteries, it is possible to effectively prevent ingress of water onto the rechargeable batteries.

In addition, in a battery pack according to a fifth aspect of the present invention, the upper surface of the battery holder 70 is inclined at a downward angle toward the drain hole 28. According to this construction, since, even if water enters the battery pack through the hook opening window, the water can be guided to the drain hole by the inclined upper surface along the communication path, and the water can be easily drained out of the battery pack.

In addition, in a battery pack according to a sixth aspect of the present invention, the edges of the partition rib 25 can partially contact the surface of the external connection terminal 33. The external connection terminal 33 can have a soldering part that is arranged for wiring in proximity to the contact part of the external connection terminal with the partition rib 25. A protruding stopper portion 88 can be formed in this soldering part. According to this construction, the protruding stopper portion can limit spreading of solder in a soldering operation. As a result, it is possible to avoid the solder from spreading to the contact part. For this reason, it is possible to avoid the bulge of spreading solder from preventing contact between the partition rib and the pack circuit board in the contact part. Thus, the partition rib can surely contact the pack circuit board. Therefore, it is possible to effectively prevent water from entering the battery pack.

In addition, in a battery pack according to a seventh aspect of the present invention, the protruding stopper portion 88 can be formed on the surface of the external connection terminal 33 by drawing. According to this construction, the protruding stopper portion can be easily formed integrally with the surface of the external connection terminal.

In addition, in a battery pack according to an eighth aspect of the present invention, a holding rib portion 27 can be arranged inside the casing 31. The holding rib portion 27 guides the upper end of the external connection terminal 33, and holds the upper end of the external connection terminal 33 from both sides of the external connection terminal 33. According to this construction, the external connection terminal can be stably held. Therefore, it is possible to improve the reliability of the battery pack.

In addition, in a battery pack according to a ninth aspect of the present invention, the holding rib portion 27 can sandwich the upper part of the external connection terminal 33. According to this construction, the holding rib can securely hold the external connection terminal from the upper surface of the external connection terminal.

The above and further objects of the present invention as well as the features thereof will become more apparent from the following detailed description to be made in conjunction with the accompanying drawings.

DETAILED DESCRIPTION OF THE EMBODIMENT(S)

Figure 1:
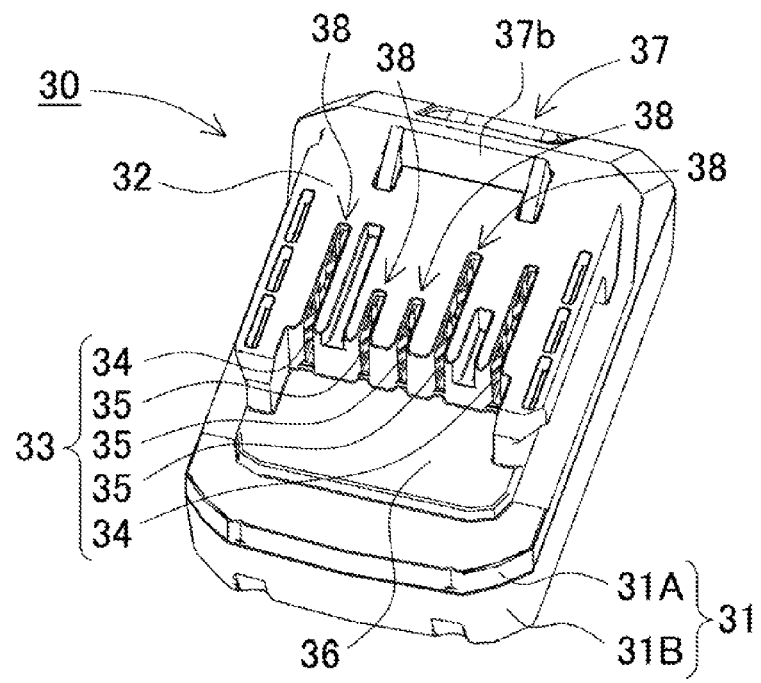
FIG. 1 is a perspective view showing a battery pack.
Figure 2:
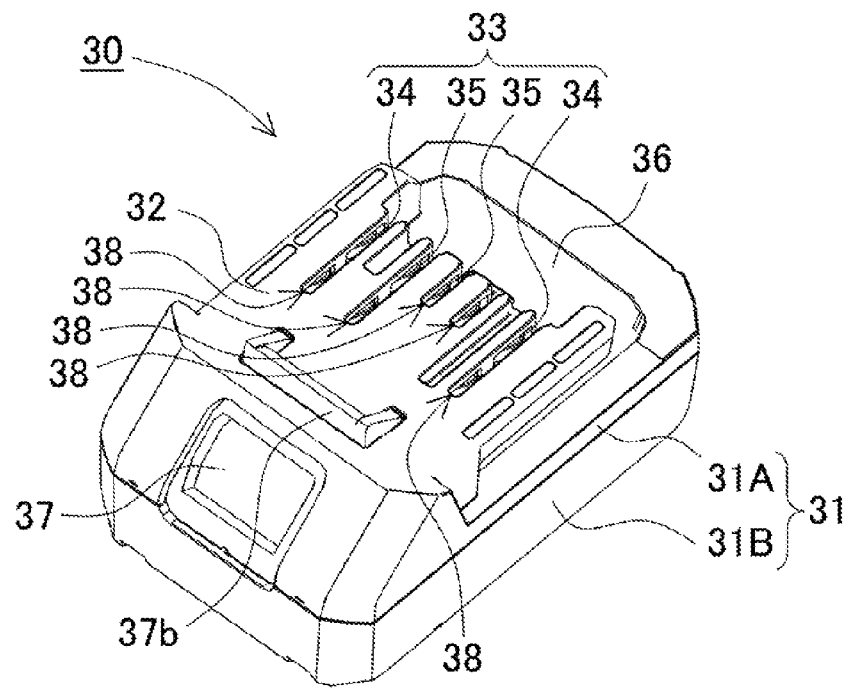
FIG. 2 is a perspective view showing the battery pack shown in FIG. 1 as viewed from the rear side.
Figure 3:
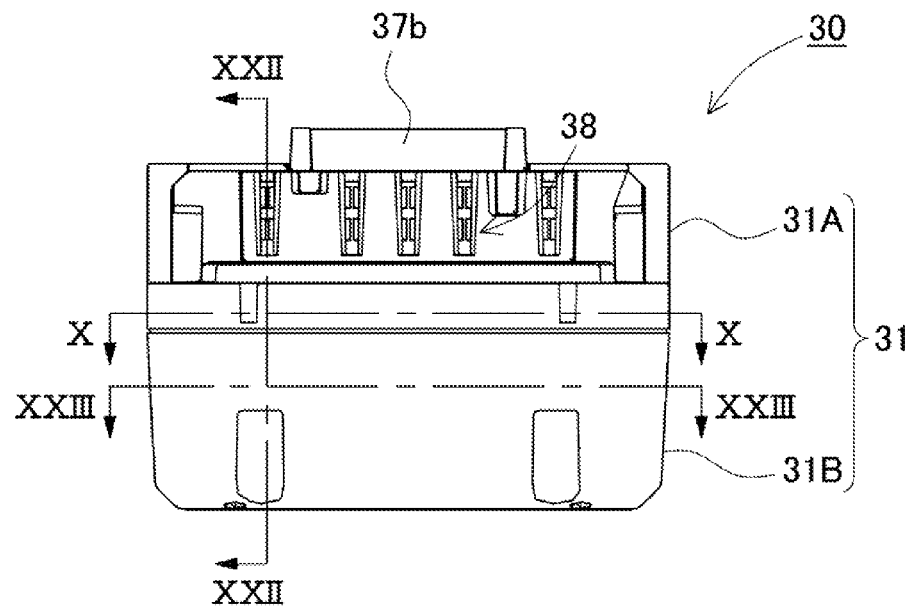
FIG. 3 is a front view of the battery pack shown in FIG. 1.

The following description will describe embodiments according to the present invention with reference to the drawings. It should be appreciated, however, that the embodiments described below are illustrations of a battery pack used therein to give a concrete form to technical ideas of the invention, and a battery pack of the invention is not specifically limited to description below. Furthermore, it should be appreciated that the members shown in the claims attached hereto are not specifically limited to members shown in the embodiments. Unless otherwise specified, any dimensions, materials, shapes and relative arrangements of the members described in the embodiments are given as an example and not as a limitation. Additionally, the sizes and the positional relationships of the members in each of the drawings are occasionally shown larger exaggeratingly for ease of explanation. Members that are the same as or similar to those of this invention are denoted with the same designation and the same reference numerals, and their description is omitted. In addition, a plurality of structural elements of the present invention may be configured as a single part that serves the purpose of a plurality of elements; on the other hand, a single structural element may be configured as a plurality of parts that serve the purpose of a single element. Also, the description of some of examples or embodiments may be applied to other examples, embodiments or the like.

FIGS. 1 to 23 show a battery pack according to an embodiment of the present invention. The battery pack 30 according to this example will be illustratively described to be applied to an electric tool as electric equipment to which the battery pack 30 is mounted.

The illustrated battery pack 30 includes a plurality of rechargeable batteries 39, the battery holder 70, battery lead plates 80, a pack circuit board 74, a casing 31, external connection terminals 33, and a lock hook 37b. The battery holder 70 holds the plurality of rechargeable batteries 39. The battery lead plates 80 connect the end surfaces of the rechargeable batteries 39 to each other. The pack circuit board 74 includes an electronic circuit connected to the rechargeable batteries 39. The casing 31 accommodates the battery holder 70 and the pack circuit board 74. The external connection terminals 33 are fastened onto the pack circuit board 74, and are connected to the rechargeable batteries 39. The external connection terminals 33 are exposed externally of the casing 31. The lock hook 37b protrudes from a surface of the casing 31, and holds the battery pack with the battery pack being attached to a battery pack charger 100.

(Casing 31)

The casing 31 has a box-shaped outward appearance as shown in FIGS. 1 to 4. The corner parts of the casing 31 are rounded. Also, the casing 31 has slots 38 in the surface of the casing 31. The external connection terminals 33 are exposed from the slots 38. The external connection terminals 33 can be connected to the electric tool as electric equipment, or connection terminals 3 of the battery pack charger 100. Also, the casing includes an attachment protruding portion 37 that holds the battery pack 30 with the battery pack 30 being mounted to the electric tool or the battery pack charger 100 after the battery pack 30 is mounted to the electric tool or the battery pack charger 100. The casing 31 is formed of resin or the like having excellent insulation and reinforcement. The illustrated external connection terminals 33 include charging/discharging terminals 34, and signal terminals 35. The charging/discharging terminals 34 are arranged on both sides. The signal terminals 35 are arranged between the charging/discharging terminals 34.

(Label Attachment Area 8)

Figure 5:
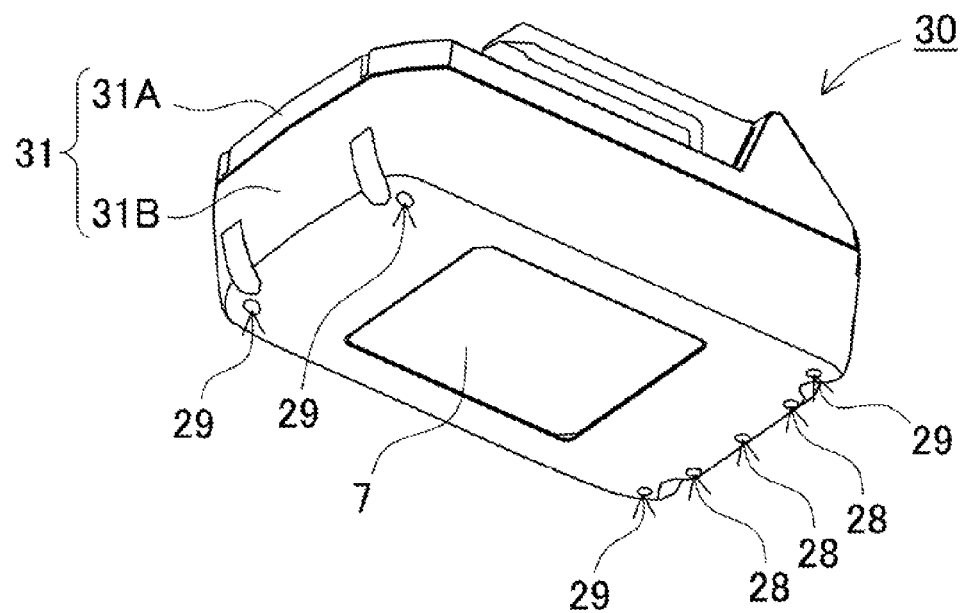
FIG. 5 is a perspective view showing the battery pack shown in FIG. 1 as viewed from the bottom side.
Figure 6:
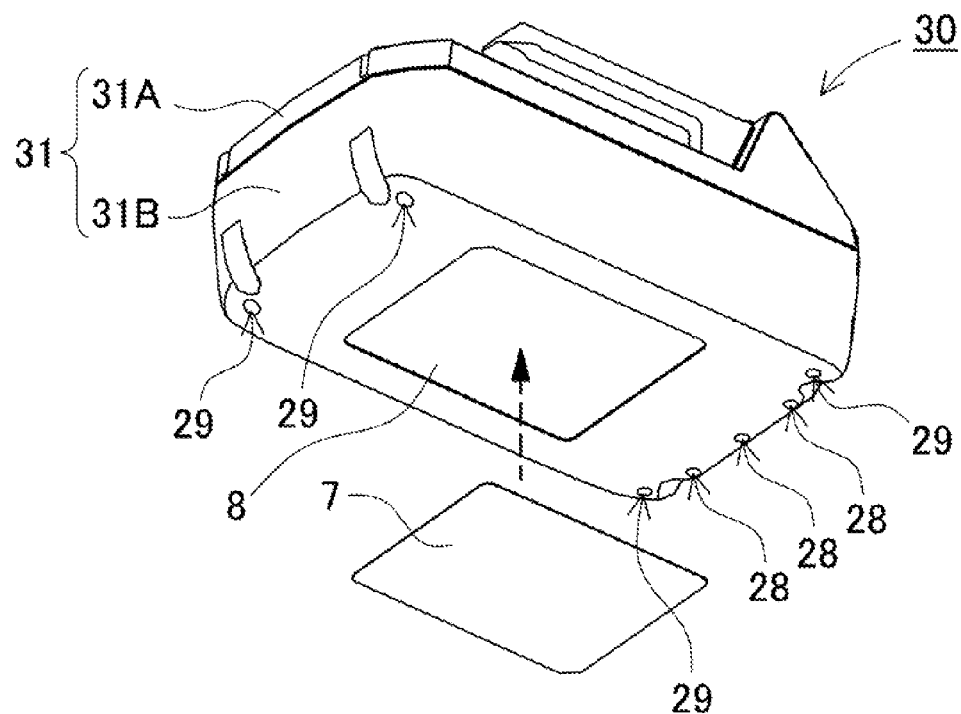
FIG. 6 is an exploded perspective view of the battery pack shown in FIG. 5 showing a label attachment area.

As shown in FIGS. 5 and 6, a label 7 is attached onto the back surface of the casing 31. The label 7 shows information including rating of the battery pack, cautions and the like. Accordingly, a label attachment area 8 is formed on the surface of the casing 31. In the case of FIG. 6, the label attachment area 8 is located on the bottom of a lower case 31B.

Figure 7:
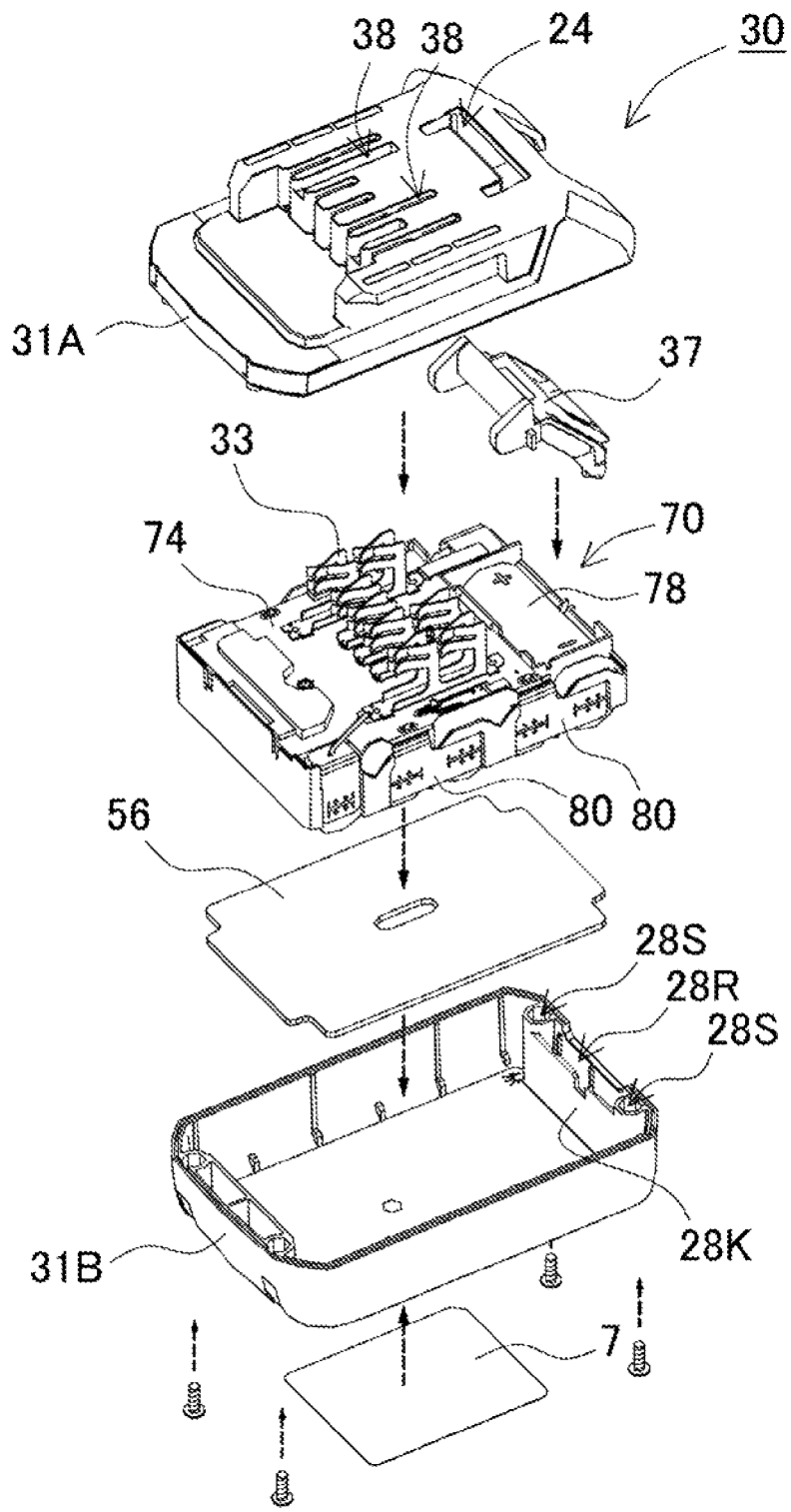
FIG. 7 is an exploded perspective view showing the battery pack shown in FIG. 1.
Figure 8:
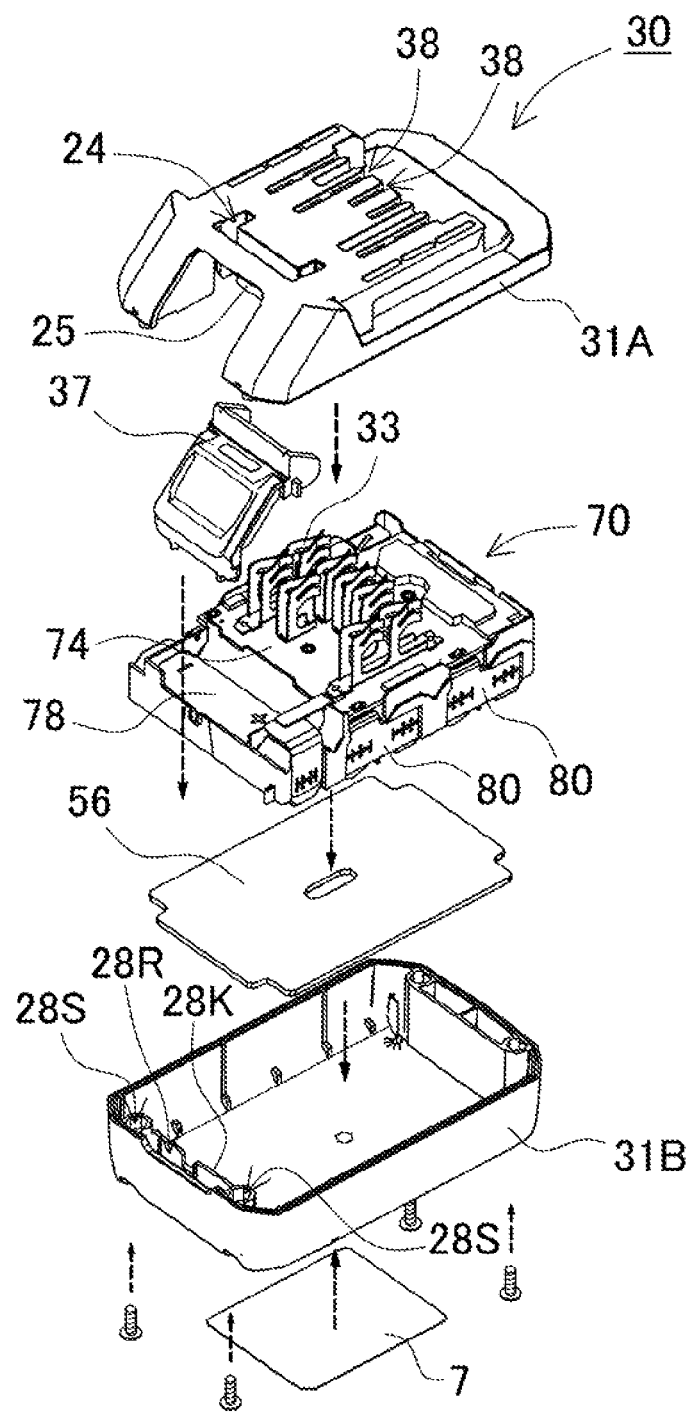
FIG. 8 is a perspective exploded view showing the battery pack shown in FIG. 7 as viewed from the back side.

The casing 31 includes divided portions of the upper and lower cases 31A and 31B as shown in the exploded perspective views of FIGS. 7 and 8. Accommodation space is formed inside the casing 31. The casing 31 accommodates the battery holder 70, the pack circuit board 74, and the attachment protruding portion 37 in the accommodation space.

(Hook Opening Window 24)

Figure 4:
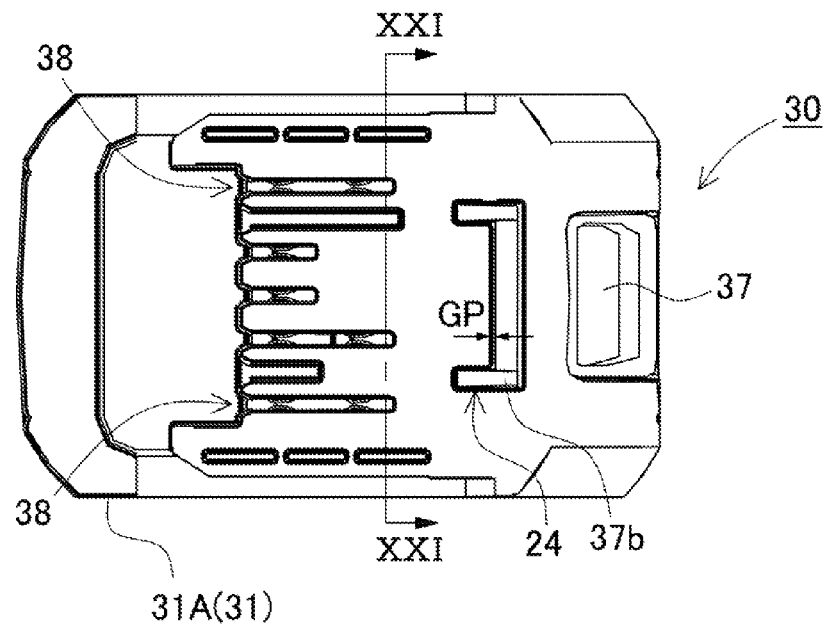
FIG. 4 is a plan view of the battery pack shown in FIG. 1.

As shown in FIG. 4 or the like, the hook opening window 24 is opened in the upper case 31A. The lock hook 37b is exposed from the hook opening window 24. The lock hook 37b composes a lock structure, which holds the battery pack 30 to prevent detachment of the battery pack 30 after the battery pack 30 is mounted to the battery pack charger 100. Also, the lock hook 37b can compose a lock structure, which holds the battery pack 30 to prevent detachment of the battery pack 30 after the battery pack 30 is mounted to the electric equipment.

(Partition Rib 25)

Figure 9:
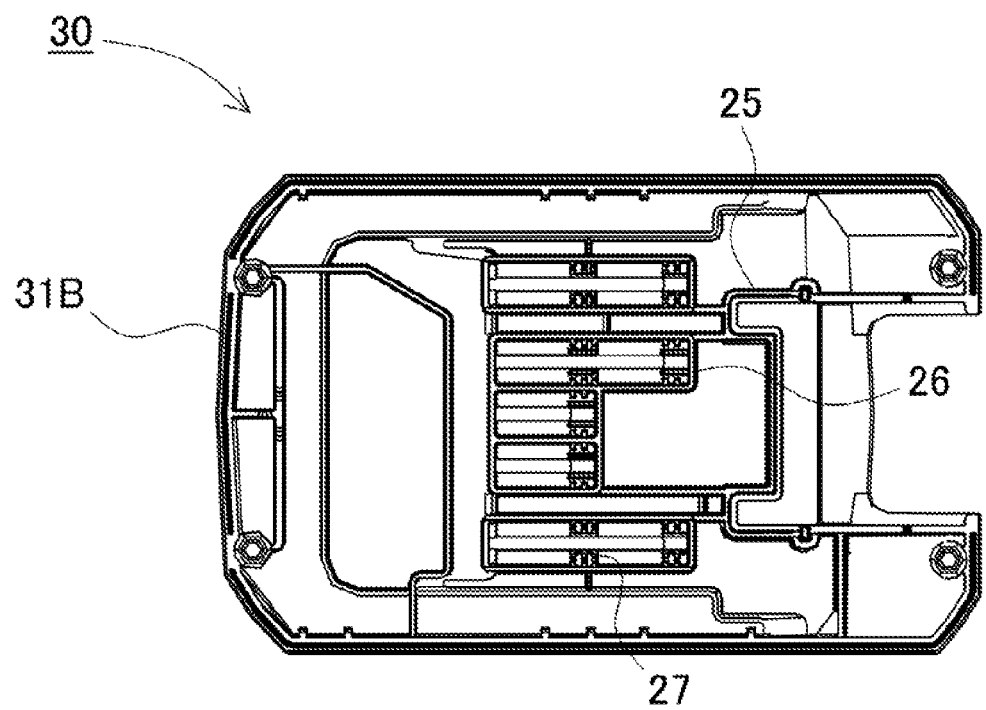
FIG. 9 is a bottom view showing an upper case shown in FIG. 4 from the back side.
Figure 10:
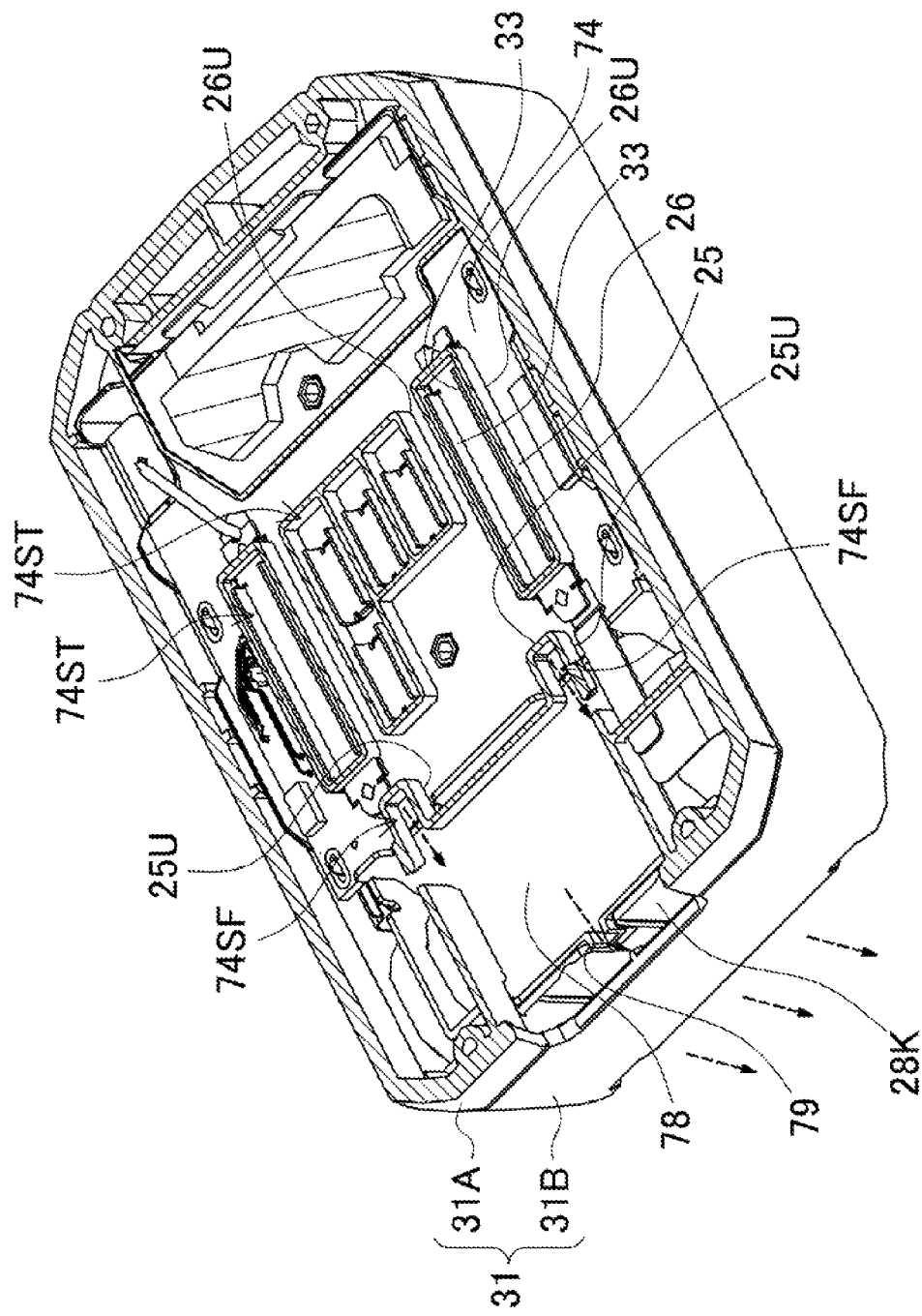
FIG. 10 is a perspective horizontal cross-sectional view showing the battery pack with the upper part of the battery pack being cut away taken along the line X-X in FIG. 3.

There is possibility that water, dust, and the like can enter the casing 31 through a gap GP between the hook opening window 24 and the lock hook 37b shown in FIG. 4 or the like. The hook opening window 24 is opened in the upper surface of the casing 31. In particular, water may rust metal components such as external connection terminals 33, or may cause unintended electrical conduction in electronic components. For this reason, it is desirable that these components are separated from water. On the other hand, if packing or the like is used for providing a complete waterproof structure, the construction will be complicated. As a result, the cost will increase. For this reason, the battery pack according to this embodiment has a construction that, even if water enters the battery pack through the gap GP in the hook opening window 24, the water can be prevented from coming in contact with electronic components and the like, and can be drained out of the battery pack. Specifically, as shown in FIGS. 9 and 10, the upper case 31A includes a partition rib 25 that extends inward of the casing from the hook opening window 24. The partition rib 25 partitions the interior of the casing so that, if water comes into the battery pack through the hook opening window 24, the water does not come into areas other than the area of the pack circuit board 74 partitioned by the partition rib 25. In other words, the water does not come into the area where the electronic circuit is mounted on the pack circuit board 74.

In the case of FIGS. 4, 9 to 11, and the like, the lock hook 37b has a rectangular U shape as viewed in the plan view. The hook opening window 24 is also opened in a rectangular U shape as viewed in the plan view corresponding to the lock hook 37b. Accordingly, the partition rib 25 also extends along the edges of this rectangular U shape inside the casing. That is, the partition rib has a shape having one side, the end parts of which protrude toward the pack circuit board 74. Thus, the pack circuit board 74 is not entirely separated by the partition rib 25, but the bottom edges 25U on both end parts of the one side of the partition rib 25 contact the surface of the pack circuit board 74 on outer peripheral parts 74SF of the pack circuit board 74 (rectangular shapes as viewed in the plan view).

Figure 19:
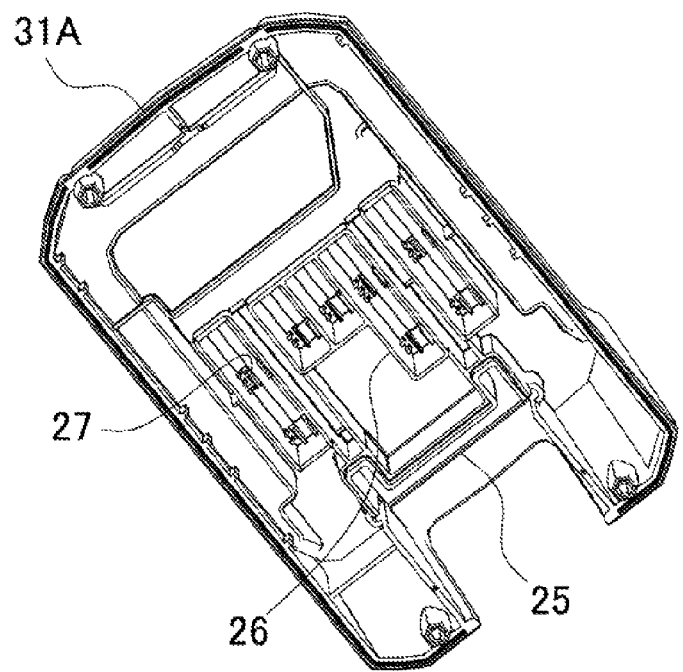
FIG. 19 is a perspective view showing the upper case shown in FIG. 9.
Figure 20:
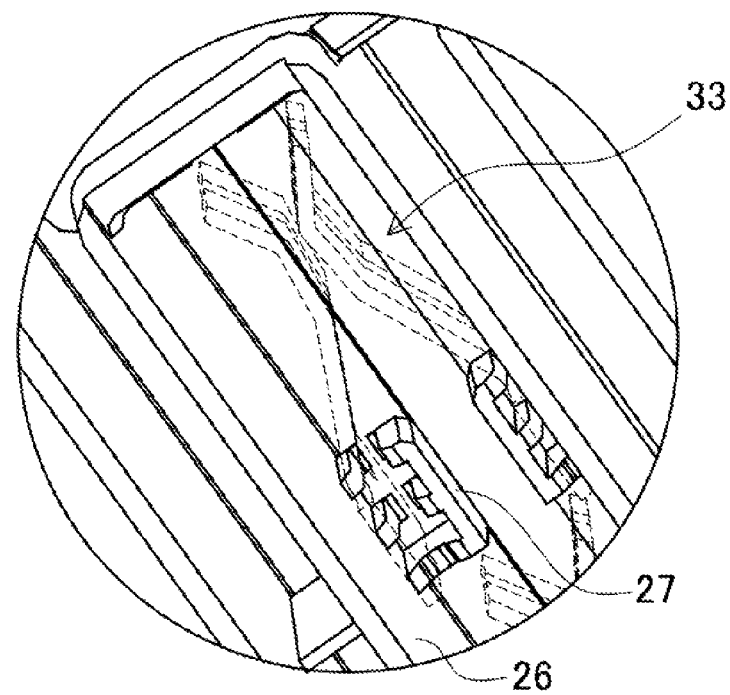
FIG. 20 is an enlarged perspective view showing a holding rib portion of the upper case shown in FIG. 19.

Terminal ribs 26 are formed on the inner surface of the upper case 31A, and define the slots 38. The terminal rib 26 surrounds a corresponding one of the external connection terminals 33, which are exposed from the slots 38. Since the terminal rib 26 surrounds the corresponding one of the external connection terminals 33, the external connection terminals 33 can be separated and insulated from each other in the casing 31. The terminal ribs 26 are formed integrally with the upper case 31A, as shown in FIGS. 9, 10, 19 and the like.

Specifically, the terminal rib 26 extends so as to define a corresponding one of the vertical slots 38 inside the casing 31. The terminal rib 26 is formed in a quadrangle shape (rectangular shape) as viewed in the plan view. The terminal rib 26 partitions the interior of the casing 31 so that, if water comes into the battery pack through the slot from which the external connection terminal 33 is exposed, the water does not enter areas other than a block 74ST of the pack circuit board 74 under the terminal rib 26. In other words, the water does not enter the area where the electronic circuit is mounted on the pack circuit board 74. Thus, the bottom edges 26U of the terminal rib 25 contact the surface of the outer periphery of the block 74ST of the pack circuit board 74 under the terminal rib 26.

The outer peripheral parts 74SF of the pack circuit board 74 under the partition rib 25 are located on the hook opening window 24 side. The blocks 74ST of the pack circuit board 74 under the terminal ribs 26 are located on the vertical slot 38 side. Water may come into the outer peripheral parts 74SF and the blocks 74ST. However, it is possible to reduce the ingress of water into areas other than the outer peripheral parts 74SF and the blocks 74ST. As shown in FIG. 10, the bottom edges 25U of each of the end parts of the one side of the partition rib 25 contact three of the four sides (i.e., the outer periphery) of each of the outer peripheral parts 74SF of the pack circuit board 74. However, there is no partition rib 25 on the other of the four sides of each of the outer peripheral parts 74SF. Accordingly, the partition rib 25 does not contact the other of the four sides of each of the outer peripheral parts 74SF. In other words, the outer peripheral parts 74SF are open. The outer peripheral parts 74SF communicate with an inclined surface 78 of the battery holder 70 (discussed later). As a result, water or water droplets, etc., will move to the inclined surface 78. Since the outer peripheral parts 74SF of the pack circuit boards 74 are located in the hook opening window 24, and the blocks 74ST of the pack circuit board 74 under the terminal ribs 26 are located in the slots 38, water may come into the outer peripheral parts 74SF and the blocks 74ST. However, electronic components are not arranged in the outer peripheral parts 74SF and the blocks 74ST. Alternatively, at least water-sensitive electronic components are not arranged in the outer peripheral parts 74SF and the blocks 74ST. Thus, important electronic components can be arranged on the pack circuit board 74 and can be separated from the outer peripheral parts 74SF and the blocks 74ST. Alternatively, electronic components may be arranged on the pack circuit board 74 in the outer peripheral parts 74SF and the blocks 74ST.

The separation does not always refer to complete waterproofing but includes a structure that can substantially prevent water from entering the separated area. Also, the contact does not always refer to completely tight contact but includes contact which can prevent water from coming into the separated area. For example, even in the case where a small clearance is created between the rib and the pack circuit board 74, water on the pack circuit board 74 will form a water droplet since surface tension acts on the water. Accordingly, such a water droplet cannot pass through the clearance. As a result, even in this case, it is possible to prevent water from coming into the separated area. For this reason, the contact in this specification can include contact having such a small clearance. Since such a small clearance is allowed, the tolerance can be low. Packing or the like is not required to provide a complete waterproof structure. The effective waterproof structure can be simply provided at low cost.

Figure 11:
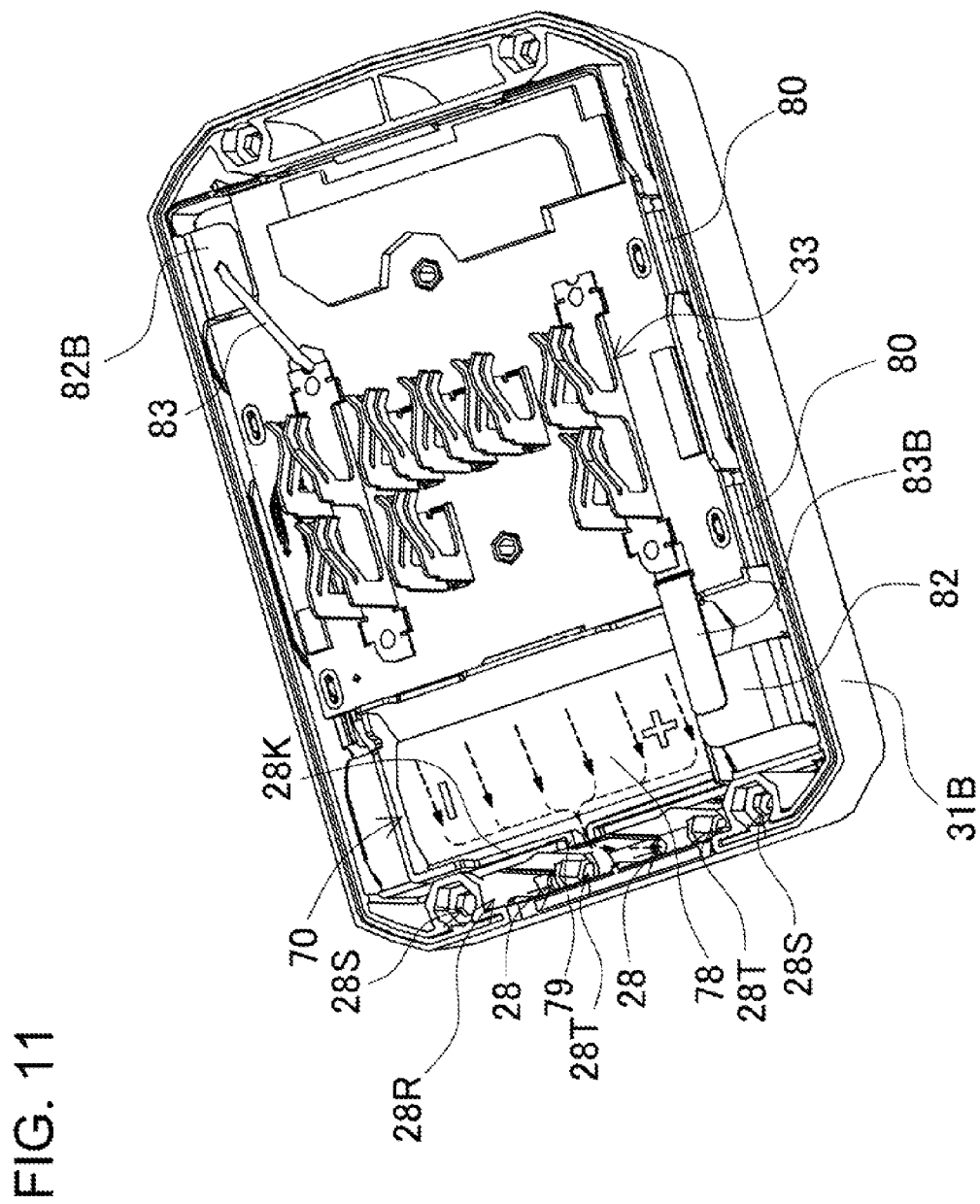
FIG. 11 is a perspective view showing the battery pack shown in FIG. 3 with the upper case being removed.

As shown in FIG. 11, the rear side (the lower side in FIG. 11) of the battery holder 70 is arranged in the part of the lower case 31B under the hook opening window 24. The rechargeable batteries 39 are held in the battery holder 70. Thus, the battery holder 70 prevents water from contacting the rechargeable battery 39.

(Drain Hole 28)

Figure 12:
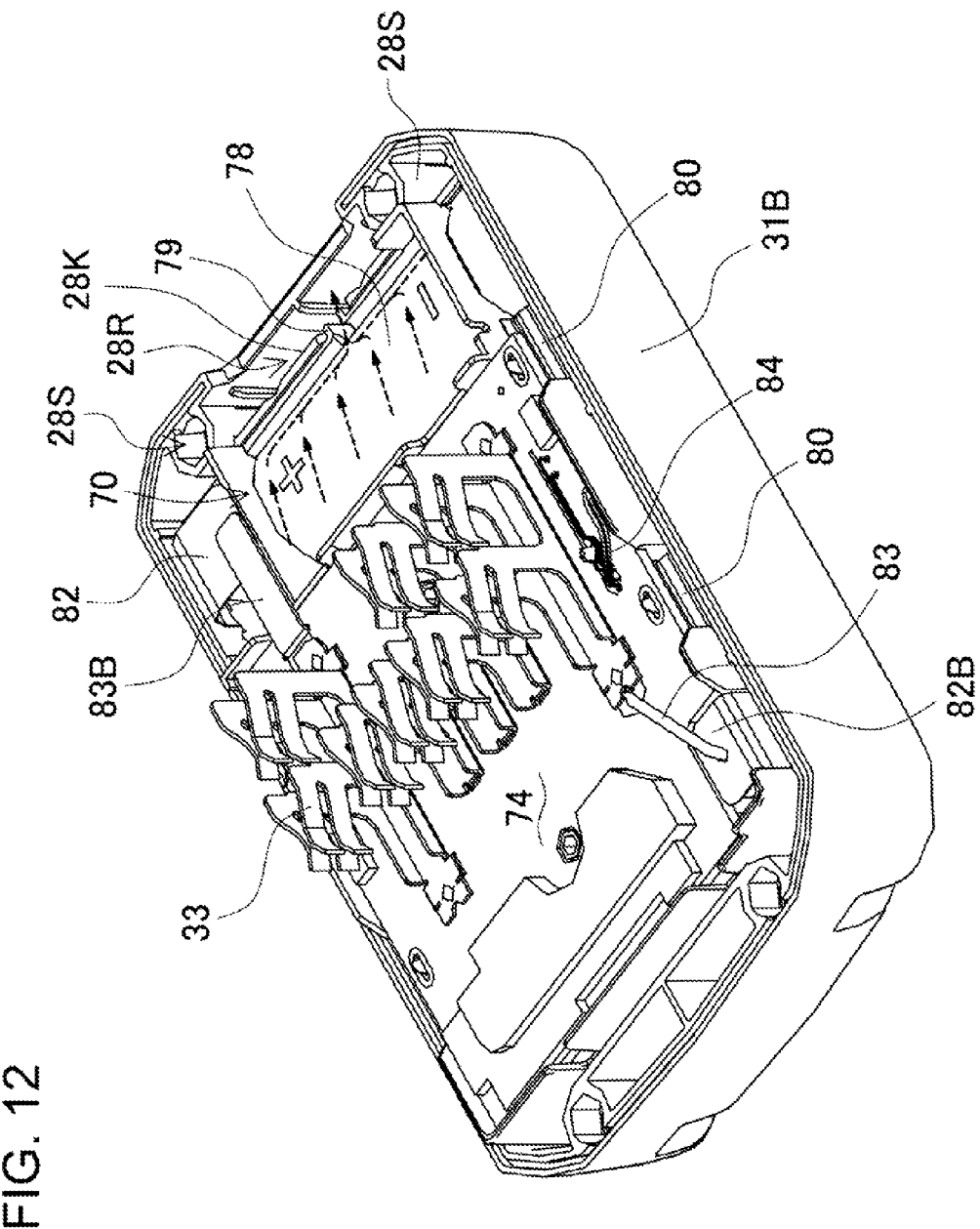
FIG. 12 is a perspective view showing the battery pack shown in FIG. 11 as viewed from the front side.

Drain holes 28 are opened in the lower case 31B. Specifically, the drain holes 28 are opened in the area of the case that communicates with the hook opening window. In other words, the interior of the case has two separated areas. One of the separated areas is a communication area 28R which communicates with the hook opening window. The other of the separated areas is an accommodation area that accommodates the rechargeable batteries and the like. If water enters the communication area through the hook opening window, the water is prevented from coming into the accommodation area. Thus, the communication area is waterproofed. In addition, the drain holes are opened in the communication area 28R. As a result, the water can be drained out of the communication area through the drain holes. To achieve this, as shown in FIGS. 10 to 12, a partitioning wall 28K is formed on the lower case 31B. Together with the partition rib 25 of the upper case 31A, the partitioning wall 28K defines the communication area 28R. The battery holder 70 is accommodated in the accommodation area defined by the partitioning wall 28K.

The communication path is formed so as to extend from the hook opening window 24 to the drain holes 28 as discussed above. Thus, even if water comes into the communication path through the hook opening window 24, the water can be drained through the drain holes 28. Also, as shown in FIGS. 10 and 11, the inclined surface 78 is formed at a downward angle toward the drain hole 28 side on the rear-side upper surface of the battery holder 70. In addition, a gateway 79 is formed in the partitioning wall 28K. Accordingly, it is possible to facilitate movement of the water along the inclined surface 78. In addition, the inclined surface 78 is inclined at a downward angle toward the gateway 79 so that the water will gather into the gateway 79. Thus, the water can be guided to the drain hole 28 side through the gateway 79. As a result, the water can be drained out of the battery pack 30.

As shown in FIG. 11, the lower case has a pair of nut holding ribs 28S. Each of the nut holding ribs 28S forms a nut opening that holds a nut. A screw threadedly engages with the nut so that the lower case 31B and the upper case 31A are fastened to each other. As shown in FIG. 11, the communication area 28R is located in the area enclosed by the aforementioned partitioning wall 28K and the end surface of the lower case 31B between the pair of the nut holding ribs 28S. In this embodiment, the outside diameter of the nut holding ribs 28S corresponds to the width of the communication area 28R. In addition, a pair of cylindrical ribs 28T is formed in the communication area 28R. The cylindrical ribs 28T hold coil springs that elastically bias the attachment protruding portion 37. The cylindrical ribs 28T have outer diameters that are substantially the same as the width of the communication area 28R. Thus, the communication area 28R is further divided into three areas.

In the case of FIG. 5, the drain holes 28 are formed so as to open at three locations on the rear side of the bottom surface of lower case 31B. Specifically, the center drain hole 28 is arranged between the pair of cylindrical ribs 28T as shown in FIG. 11. Each of the other drain holes 28 is arranged between the cylindrical rib 28T and the nut holding rib 28S. Since the drain hole is formed in each of the three divided areas of the communication area 28R, water guided to the three divided areas can be drained out of the divided areas.

The aforementioned gateway 79 extends to the area where the center drain hole 28 is formed; in other words, between the pair of the cylindrical ribs 28T. Thus, when water flows in the gateway 79, the water can be drained through the center drain hole out of this area. In particular, in the case of FIG. 11, since the distance between the pair of cylindrical ribs 28T is greater than the distance between the cylindrical rib 28T and the nut holding rib 28S, a larger amount of water can be gathered in the area between the pair of cylindrical ribs 28T so that the gathered water can be collectively drained through the center drain hole 28. On the other hand, since the height of the cylindrical ribs 28T is lower than the partitioning wall 28K, the three divided areas of the communication area 28R communicate with each other in the part that is higher than the height of the cylindrical rib 28T. Accordingly, if a larger amount of water gathered in the center area, when the water level rises to the height higher than the cylindrical rib 28T, the water starts flowing into the areas on the right and left sides of the cylindrical ribs 28T, in other words, the areas between the cylindrical ribs 28T and the nut holding ribs 28S. As a result, the water can also be drained through the drain holes 28 on both sides.

The drain hole is not limited to the communication area 28R but can be opened in the accommodation area. In the case of FIG. 5 or the like, second drain holes 29 are open in the four corner parts of the accommodation area. Accordingly, even if water undesirably comes into the accommodation area of the battery pack 30, the water is drained from the second drain holes 29 formed in the lower surface of the lower case 31B, as shown in FIGS. 5 and 6 and the like.

(Battery Holder 70)

Figure 13:
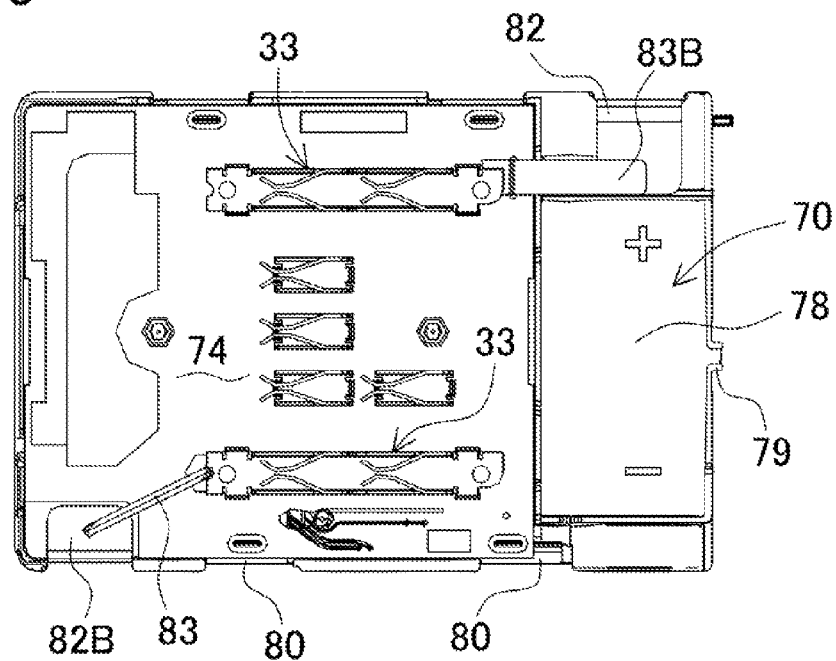
FIG. 13 is a plan view of a battery holder shown in FIG. 7.
Figure 14:
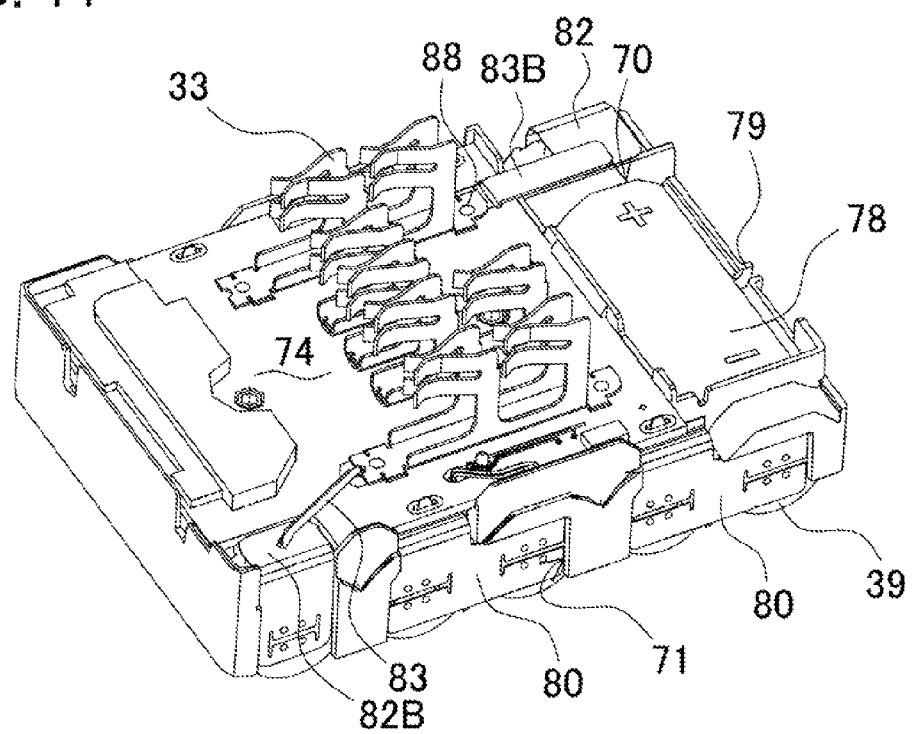
FIG. 14 is a perspective view showing the battery holder shown in FIG. 13 before soldering.
Figure 15:
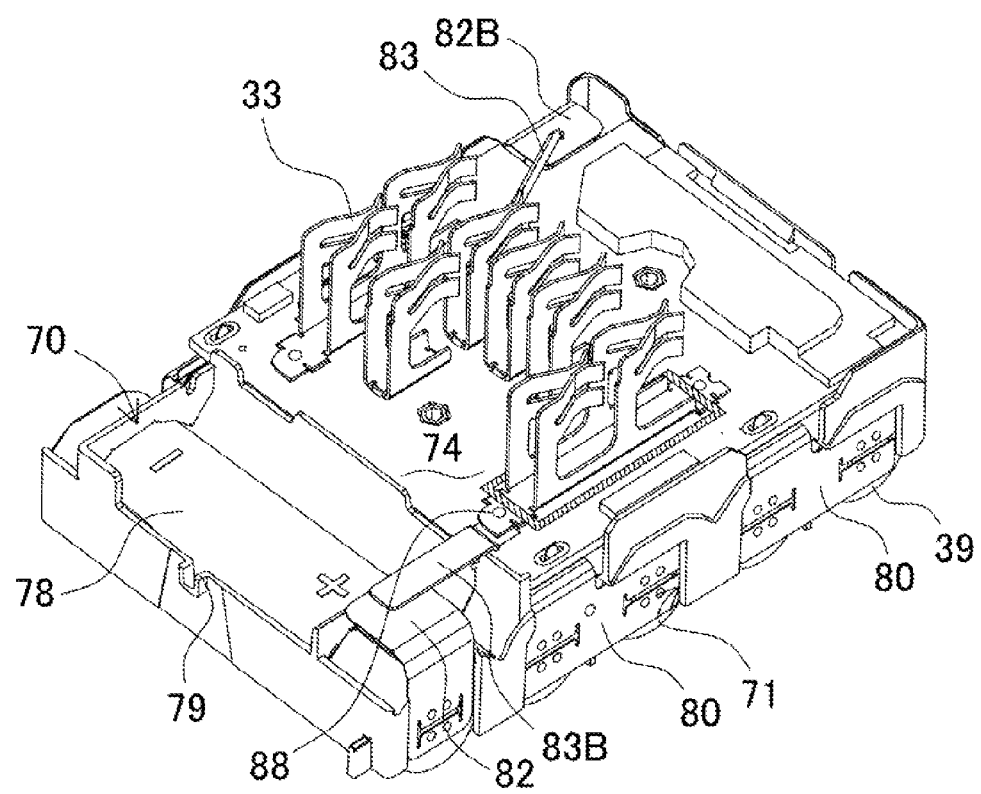
FIG. 15 is a perspective view showing the battery pack shown in FIG. 14 as viewed from the rear side.

The battery holder 70 holds the rechargeable batteries 39, the pack circuit board 74, the battery lead plates 80, and lead wire lines, as shown in FIGS. 13, 14 and 15. The battery holder 70 has battery accommodation space on the lower side, and a circuit board holding portion 75 on the upper side as shown in the exploded perspective view of FIG. 16. The battery accommodation space accommodates the rechargeable batteries 39. The circuit board holding portion 75 holds the pack circuit board 74. The end surfaces of the rechargeable batteries 39 are exposed from exposed portions 71, which are open in the end surfaces of the battery holder 70. The end surfaces of the rechargeable batteries 39 are connected to each other by the battery lead plates 80. A battery core portion is composed of the rechargeable batteries 39, which are held by the battery holder 70. The outputs of the battery core portion are connected to the pack circuit board 74 through an output lead plate 82 (lower left side in FIG. 15) and a connection lead plate 83B, and a second output lead plate 82B and an output lead wire line 83 (upper right side in FIG. 15). Also, the output of the battery core portion, signals from the pack circuit board 74, and the like are provided through the external connection terminals 33. The battery lead plates 80 are connected to the pack circuit board 74 through a signal lead line 84. Since high voltage is applied to the output lead wire line 83, a thick conductor line, available for high current, is used as the output lead wire line 83. On the other hand, since the signal lead line 84 serves as a signal line, even a thin conductor line can be used as the signal lead line 84.

(External Connection Terminal 33)

The pack circuit board 74 includes the charging/discharging terminals 34, and the signal terminals 35 which serve as the external connection terminals 33. The output of the battery core portion is connected to the electric tool or the battery pack charger 100 through the charging/discharging terminals 34. In this embodiment, the output from the battery core portion is connected to the charging/discharging terminals 34 on the pack circuit board 74 through the second output lead plate 82B and the output lead wire line 83, and the output lead plate 82 and the connection lead plate 83B. The connection lead plate 83B is formed separately from the output lead plate 82. Alternatively, the connection lead plate 83B may be formed integrally with the output lead plate 82.

(Electronic Circuit)

Figure 22:
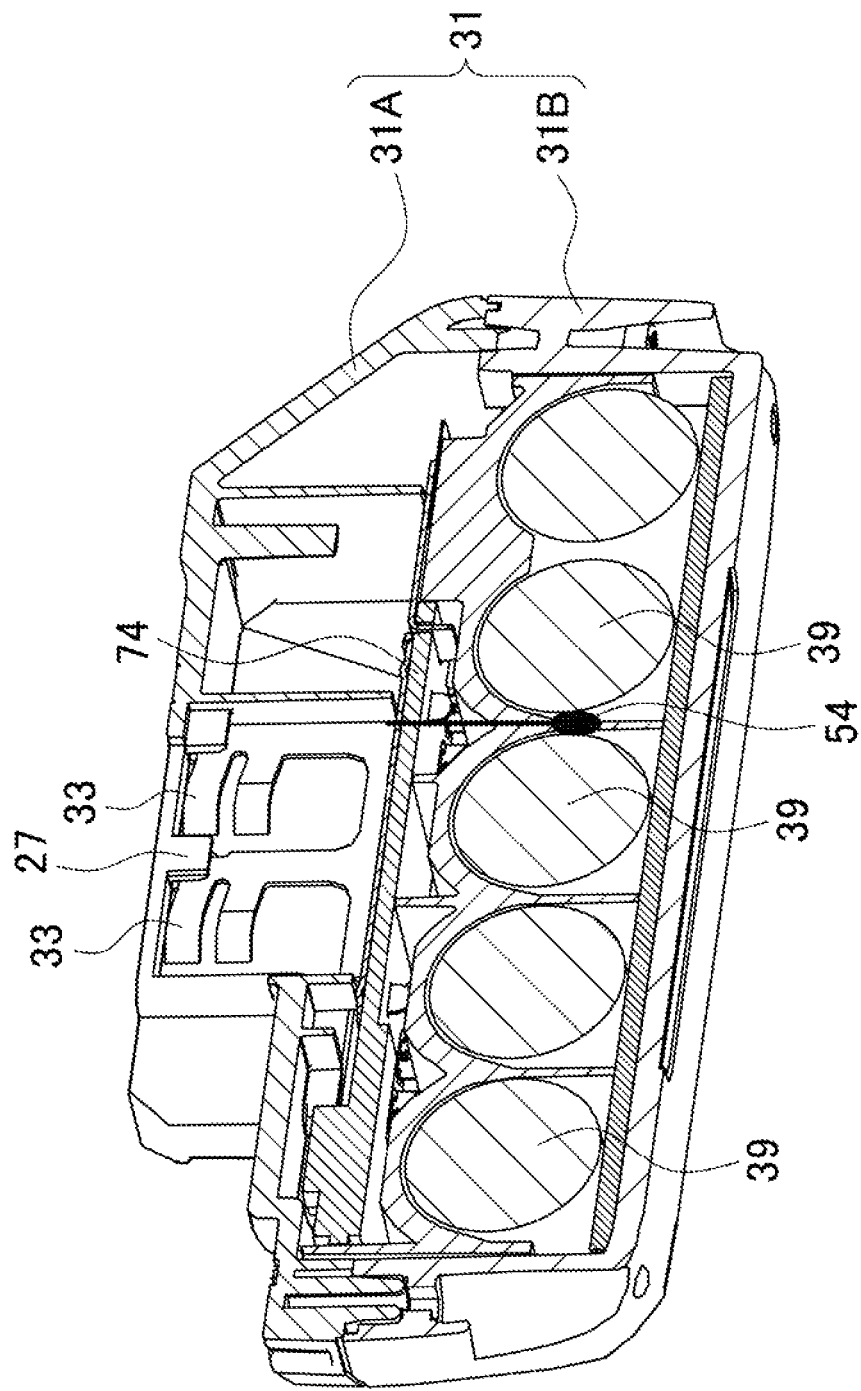
FIG. 22 is a cross-sectional view showing the battery pack shown in FIG. 3 taken along the line XXII-XXII.

The electronic circuit is mounted on the pack circuit board 74, and is connected to the rechargeable batteries 39. The electronic circuit is a protection circuit, which protects the rechargeable batteries, for example. The protection circuit is connected to the rechargeable batteries 39 through the battery lead plates 80 and the signal lead line 84, and detects the battery voltages of the rechargeable batteries 39, for example. The protection circuit is also connected through the signal lead line 84 shown in FIG. 12 to a temperature detection portion 54, which detects the battery temperature (FIG. 22).

(Signal Terminal 35)

Also, the pack circuit board 74 includes the signal terminals 35 (see FIG. 1), which provide the output of the protection circuit, battery information, and the like. The charging/discharging terminals 34, and the signal terminals 35 are exposed from the surface of the casing 31, as shown in FIG. 1 or the like. Correspondingly, as shown in FIGS. 1 to 7, the slots 38 are formed in the upper case 31A.

(Protruding Stopper Portion 88)

Figure 17:
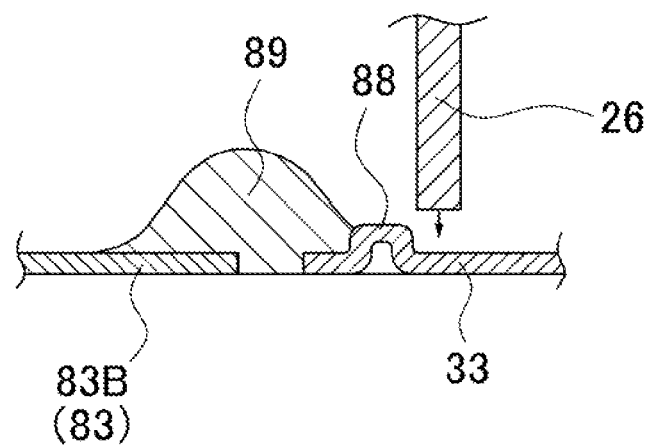
FIG. 17 is a cross-sectional view schematically showing a protruding stopper portion with the protruding stopper portion limiting the spreading of solder.
Figure 18:
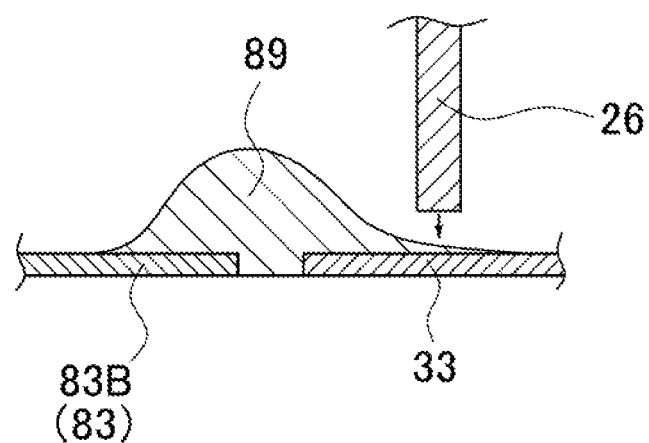
FIG. 18 is a cross-sectional view schematically showing the spreading of solder in the case where the protruding stopper portion is not formed.

As discussed above, the terminal ribs 26 contact parts of the pack circuit board 74. The shaded line in FIG. 15 shows one of the parts where the terminal ribs 26 contact the pack circuit board 74. The external connection terminals 33 are connected by soldering to the output lead plate 82 and the connection lead plate 83B as shown in FIG. 15, and to the output lead wire line 83 as shown in FIG. 14. Specifically, the external connection terminal 33 is arranged so as to be spaced away from the connection lead plate 83B, which is connected to the output lead plate 82, (or from the output lead wire line 83), and then the external connection terminal 33 and the connection lead plate 83B (or the output lead wire line 83) are connected to each other by soldering so that solder fills the gap between the external connection terminal 33 and the connection lead plate 83B (or the output lead wire line 83), as shown in FIG. 17. An end part of the external connection terminal 33 is a soldering area. In the soldering process, if solder 89 flows and spreads excessively, the solder 89 may extend beyond the soldering area and reach the contact surface between the terminal rib 26 and the external connection terminal 33 as shown in FIG. 18. In this case, it is conceivable that the solder 89 bulges or forms a convex shape on the upper surface of the external connection terminal 33. An unintended gap will be created between the edge of the terminal rib 26 and the external connection terminal 33. As a result, the battery pack may not be waterproofed. To avoid this, as shown in FIGS. 15 and 17, the protruding stopper portion 88 is formed in the part of the external connection terminal 33, which is located in proximity to the soldering area. The protruding stopper portion 88 protrudes from the surface of the external connection terminal 33. Since the protruding stopper portion 88 bulges in a hill shape, it is possible to physically limit spreading of the solder 89. It is preferable that the protruding stopper portion 88 be formed on the surface of the external connection terminal 33 integrally with the external connection terminal 33 by drawing or the like. The protruding stopper portion 88 is preferably formed at the edge of the soldering area. This can accurately define the spreading area of the solder 89. As a result, the soldering effect can be reliably provided. In addition, it is possible to prevent the solder 89 from adversely affecting the separation provided by the terminal rib 26. In this embodiment, the protruding stopper portion 88 is formed in a circular shape as viewed in the plan view (i.e., in a hemispherical shape). However, the protruding stopper portion is not limited to this shape. The protruding stopper portion can be formed in any shape such as a polygonal shape and a linear shape, which can limit the spreading of the solder. Alternatively, the protruding stopper portion may be additionally arranged as a separated member on the surface of the external connection terminal.

(Holding Rib Portion 27)

Figure 21:
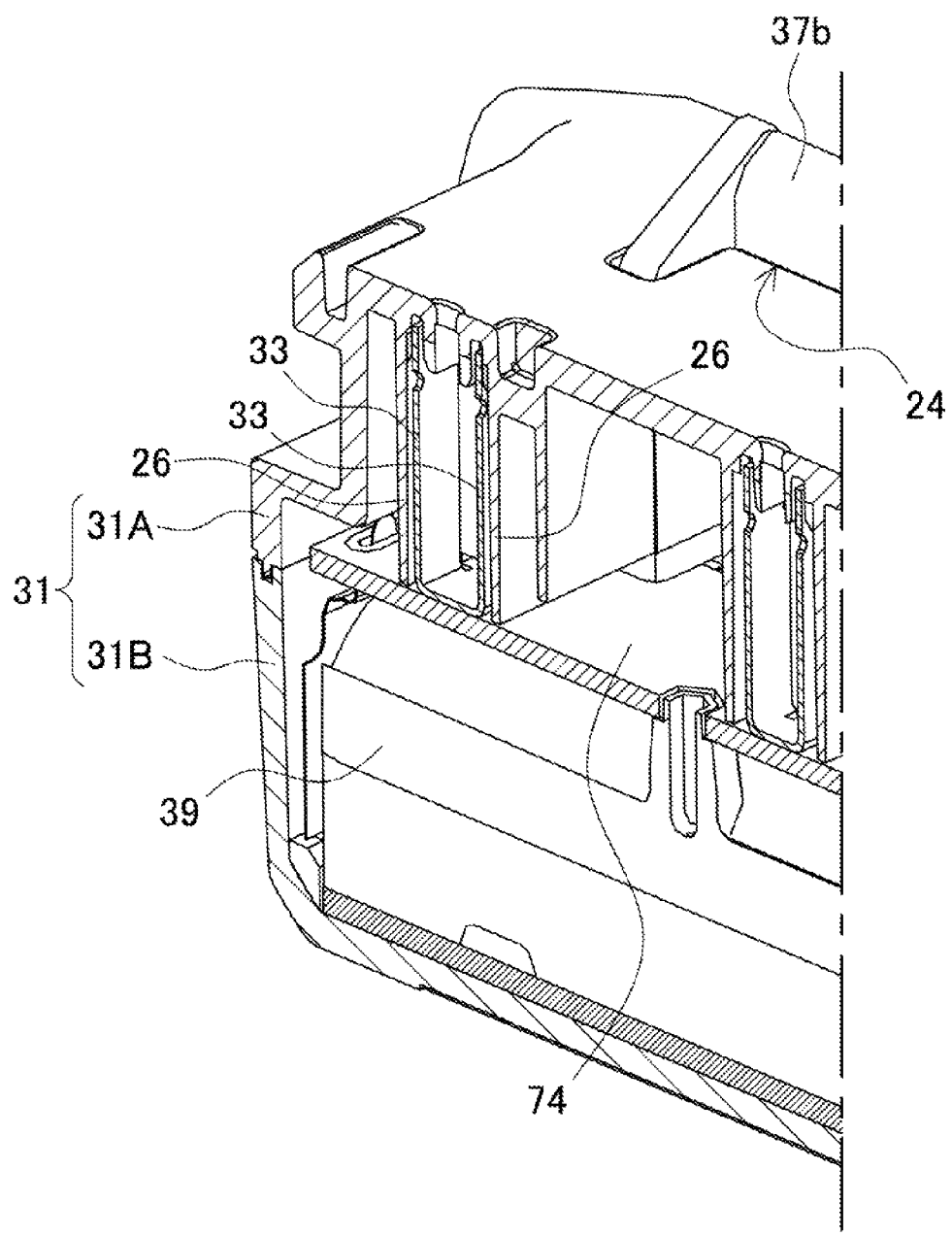
FIG. 21 is a cross-sectional view showing the battery pack shown in FIG. 4 taken along the line XXI-XXI.

The external connection terminals 33 are fastened onto the pack circuit board 74 as shown in FIG. 12 or the like, as discussed above. The upper ends of the external connection terminals 33 are held by the holding rib portions 27, which are formed on the inner surface of the upper case 31A. As shown in FIGS. 19 to 22, the upper case 31A includes the holding rib portions 27. The holding rib portions 27 are arranged on the inner surfaces of the terminal ribs 26, which accommodate the external connection terminals 33. The holding rib portion 27 forms a rectangular U shape in cross-section, as shown in FIG. 21. The external connection terminal 33 is inserted into this rectangular U-shaped part. Thus, the upper end of the external connection terminal 33 is supported by the holding rib portion 27. The external connection terminal 33 is shown by the dotted lines in FIG. 20. The holding rib portion 27 sandwiches the upper end of the external connection terminal 33. Thus, the lower surface of the external connection terminal 33 is supported by the pack circuit board 74, while the upper end of the external connection terminal 33 is supported by the holding rib portion 27. As a result, the external connection terminal 33 can stably serve as a contact for a long time.

Conventional terminals as the external connection terminal 33 are fastened only to the pack circuit board. Such a conventional terminal gets relatively more easily deformed or distorted with the number of attachment/detachment to/from the battery pack charger 100 and the electric tool for repeated use. In particular, the conventional external connection terminal is fastened in an upright orientation on the pack circuit board. Also, the conventional external connection terminal extends in the vertical direction. In addition, the upper end of the conventional external connection terminal is a free end. Accordingly, the upper end of the conventional external connection terminal relatively easily swings in the horizontal direction. Additionally, the external connection terminal is formed of flexible metal plate. As a result, the conventional external connection terminal gets relatively more easily deformed with years of use. If the external connection terminal is deformed, the press forces will be deviated in contacts between the external connection terminal and the charger-side terminal. For this reason, problems will arise in that contact resistance difference occurs or poor contact occurs. To solve the problems, the holding rib portion 27 is formed on the inner surface of the upper case 31A, and holds the upper end of the external connection terminal 33, which extends in the vertical direction, as discussed above. Thus, the upper and lower sides of the external connection terminal 33 can be stably supported. Accordingly, the external connection terminal 33 can be stably maintained in the same orientation for many years so that the press force of the contact can be constant. Therefore, it is possible to provide an effect that the reliability is improved.

It is preferable that the holding rib portion 27 be formed integrally with the terminal rib 26 on the inner surface of the upper case 31A as shown in FIG. 19 or the like. As shown in the enlarged view of FIG. 20, the open end of the holding rib portion 27 is rounded and is widely open. As a result, the external connection terminal 33 can be easily guided into the holding rib portion 27.

(Rechargeable Battery 39)

Figure 23:
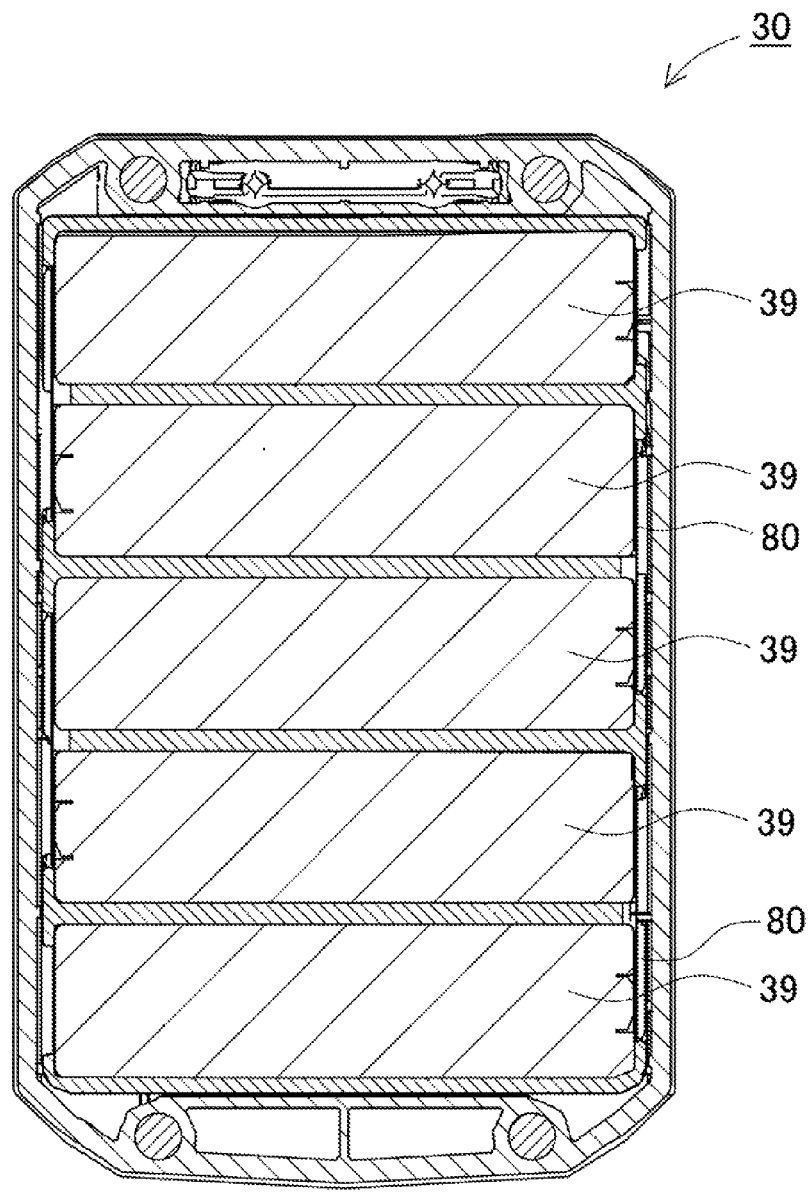
FIG. 23 is a horizontal sectional view showing the battery pack shown in FIG. 3 taken along the line XXIII-XXIII.

The casing 31 is formed in a shape that can accommodate the rechargeable batteries 39. In this embodiment, cylindrical rechargeable batteries are used as the rechargeable batteries 39. The cylindrical rechargeable batteries include an exterior case that extends in the longitudinal direction. As shown in FIGS. 7 to 16, the rechargeable batteries 39 are coplanarly arranged substantially in parallel to and adjacent to each other in the casing 31 side by side. The rechargeable batteries 39 contained in the battery pack 30 are lithium-ion batteries. However, as the rechargeable batteries, any rechargeable batteries such as nickel metal hydride batteries, nickel-cadmium batteries and polymer batteries can be used. In the case where a plurality of rechargeable batteries are serially connected to each other, the output voltage of the battery pack can be high. In the case where a plurality of rechargeable batteries are connected in parallel to each other, the output current of the battery pack can be high. In this embodiment, the rechargeable batteries 39 are lithium ion batteries. As shown in FIG. 23, five batteries are serially connected to each other so that the output voltage is set to 18 V. If four batteries are serially connected to each other, the output voltage is set to 14.4 V. However, the number and connection of rechargeable batteries included in the battery pack are not limited. The number of rechargeable batteries and the output voltage of the battery pack can be adjusted in accordance with the types and applications of the electric equipment.

(Battery Accommodation Space 72S)

Figure 16:
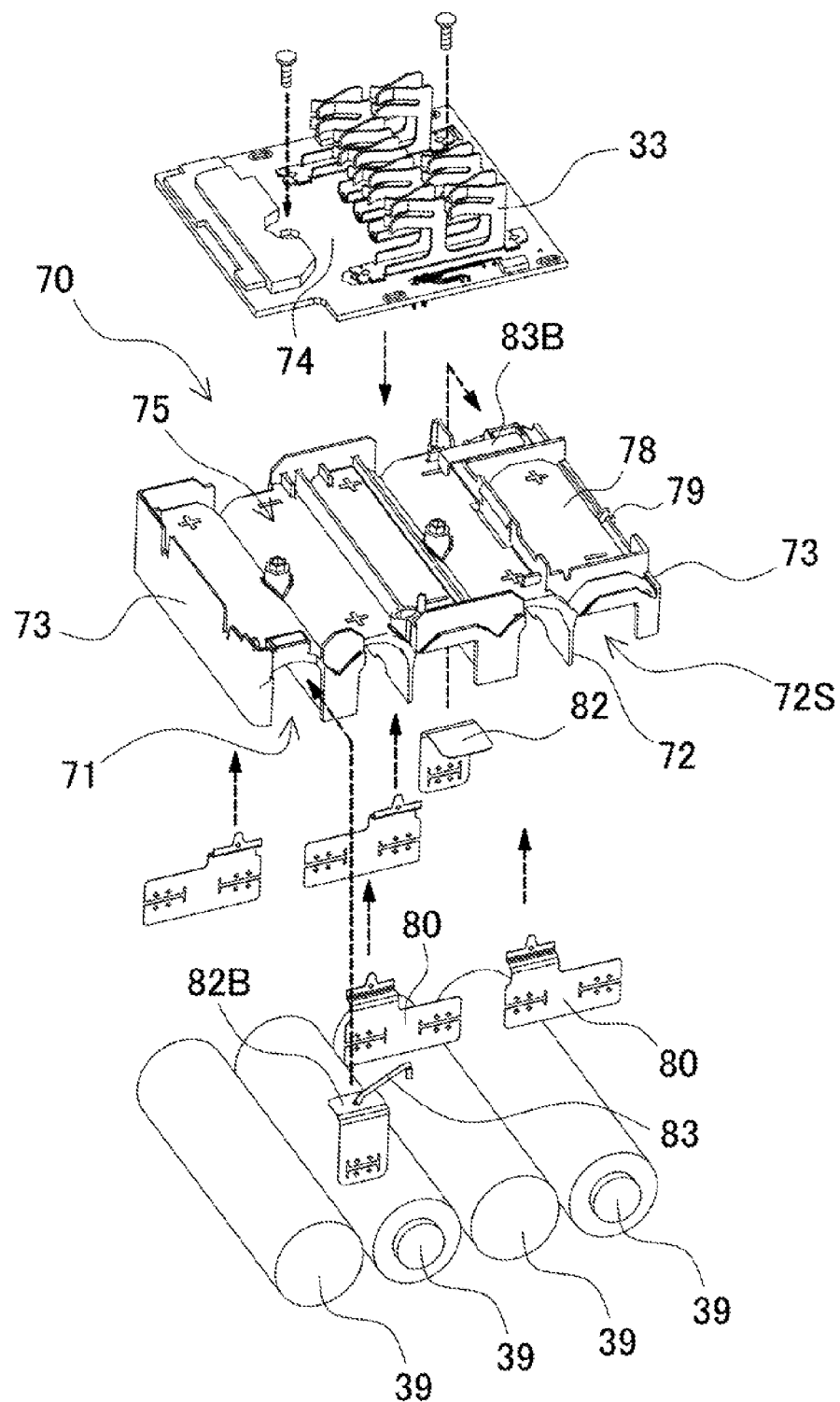
FIG. 16 is an exploded perspective view of the battery holder shown in FIG. 14.

The battery accommodation space of the battery holder 70 is divided by spacer walls 72, as shown in the perspective view of FIG. 16. The rechargeable batteries 39 are arranged adjacent to each other in the battery accommodation space with the rechargeable batteries 39 being electrically separated from each other by the spacer walls 72. The spacer walls 72 protrude downward. The rechargeable batteries 39 are inserted from the lower side into and accommodated in the space between the spacer walls 72. In the case of FIGS. 16 and 23, the battery holder includes four spacer walls 72, and accommodates five rechargeable batteries 39. As shown in FIGS. 14 to 16, etc., holder side walls 73 are arranged on both sides of the battery holder, and cover only the upper parts of the side surfaces of the rechargeable batteries 39, which are located on the ends of the rechargeable batteries 39. Thus, the side surfaces and lower surfaces of the rechargeable batteries 39 are exposed from the battery holder. In addition, the accommodation parts of the battery holder 70 are curved so as to conform to the curved surfaces of the cylindrical rechargeable batteries 39 as shown in FIG. 16. The accommodation parts of the battery holder 70 are located above the rechargeable batteries 39. The accommodation parts of the battery holder are open in an inverted U shape in section. The rechargeable batteries 39 are inserted into the accommodation parts of the battery holder, which are open downward. The spacer walls 72 extend downward from the parts between the rechargeable batteries 39 arranged adjacent to each other, but do not protrude from the upper surface of the battery holder 70. The circuit board holding portion 75 is formed on the upper surface side of the battery holder 70, and holds the pack circuit board 74.

(Spacer Wall 72)

The distance between the spacer walls 72 is dimensioned substantially the same as or slightly smaller than the diameter of the rechargeable batteries 39 so that the rechargeable batteries 39 can be held between the spacer walls 72 when the rechargeable batteries 39 are accommodated in the accommodation parts of the battery holder. The battery holder 70 is formed of resin such as plastics that are excellent in electrical insulation and thermal insulation and have flexibility. The spacer walls 72 are formed integrally with the battery holder 70 by molding. Thus, when the rechargeable batteries 39 are inserted into the parts between the spacer walls 72, the spacer walls 72 are elastically deformed so that the side surfaces of the rechargeable batteries 39 are pressed. As a result, the rechargeable batteries 39 are firmly held between the spacer walls 72. Also, the rechargeable batteries 39 adjacent to each other can be eclectically and thermally insulated from each other by the spacer walls 72. As a result, for example, even if the temperature of one of the rechargeable batteries gets high, it is possible to reduce thermal conduction from one of the rechargeable batteries to an adjacent battery.

(Exposed Portion 71)

The exposed portions 71 are formed in the end surfaces of the battery holder 70, and at least partially expose the end surfaces of the rechargeable batteries 39 accommodated in battery accommodation space. Although the exposed portions 71 expose the end surfaces of the rechargeable batteries 39, the exposed portions 71 are dimensioned so as to be smaller than the end surfaces of the rechargeable batteries 39 so that the rechargeable batteries 39 do not pass through the exposed portions 71. In the case of FIGS. 14 to 16, etc., the exposed portions 71 are formed by rectangular U-shaped side surfaces of the battery holder which are open downward so that the upper part and the side parts of the end surface of rechargeable battery 39 are partially covered. The battery holder 70 accommodates the rechargeable batteries 39 in the battery accommodation space with the end surfaces of the rechargeable batteries 39 being exposed from the exposed portions 71 and connected to each other by the battery lead plates 80.

(Battery Lead Plate 80)

As shown in the perspective view of FIG. 16, etc., the battery lead plates 80 are formed from a highly conductive metal plate, and are dimensioned to be accommodated in the exposed portions 71. The welding slits for spot welding are formed in the battery lead plate 80. Thus, the battery lead plate 80 can be secured onto the end surfaces of the rechargeable batteries 39, which are arranged adjacent to each other and accommodated in the battery accommodation space.

(Circuit Board Holding Portion 75)

The circuit board holding portions 75 are formed on the upper surface of the battery holder 70, and hold the pack circuit board 74. The circuit board holding portions 75 are arranged substantially on a center line of the battery arrangement defined by the rechargeable batteries 39 arranged side by side as shown in the exploded perspective view of FIG. 16 or the like. A screw hole is formed in the circuit board holding portion 75. A screw can be screwed into the screw hole to secure the pack circuit board 74 onto the circuit board holding portion 75. Screw through holes are formed on a center line in the pack circuit board 74. The pack circuit board 74 is secured onto the upper surface of the battery holder 70 by the screws.

(Temperature Detection Portion 54)

The temperature detection portion 54 is fastened to the battery holder 70, and detects the temperature of the rechargeable batteries 39. The temperature detection portion 54 can be a temperature sensor, which can detect temperature information of an electric signal, such as thermistor. The temperature detection portion 54 is fastened between two of the rechargeable batteries, which are located in the central part of the battery arrangement, as shown in FIG. 22 or the like. In general, the temperature detection portion is often fastened to one of rechargeable batteries, which is located on the end part of the battery arrangement. However, in the case where a plurality of rechargeable batteries are arranged side by side and accommodated in the casing, the temperature is likely to increase in the central part of the battery arrangement. For this reason, it is conceivable that the temperature in the central part will be higher than the end part of the battery arrangement. In this embodiment, in order to effectively detect the temperature of the rechargeable batteries using a small number of temperature detection portions, the temperature detection portion is arranged between two of the rechargeable batteries, which are located in the central part of the battery arrangement, so that the highest temperature of the rechargeable batteries can be detected. Thus, the highest battery temperature information can be provided to the pack circuit board. Therefore, safety can be improved.

(Temperature Detector Insertion Hole)

A temperature detector insertion hole is opened in the upper surface of the battery holder 70. The temperature detection portion 54 is arranged in the bottom part of the temperature detector insertion hole between the two of the rechargeable batteries 39, and is in contact with both of the two rechargeable batteries 39. The signal lead line 84 is connected to the temperature detection portion 54, and is drawn from the temperature detector insertion hole. Thus, the battery temperature information can be provided to the pack circuit board 74. In this embodiment, the pack circuit board 74 is fastened to a position capable of closing the temperature detector insertion hole. Thus, the opening of the temperature detector insertion hole can be closed by the pack circuit board 74. As a result, there is an advantage that it is possible to reduce the possibility that foreign matter such as dust, and water enter the battery holder 70 through the temperature detector insertion hole. Also, it is possible to provide an effect that the electrical connection distance can be short between the temperature detection portion 54 and the pack circuit board 74.

(Sheet Member 56)

The aforementioned battery holder 70 is accommodated in the casing 31, as shown in the exploded perspective view of FIG. 7. A sheet member 56 is preferably interposed between the battery holder 70 and the lower case 31B. The sheet member 56 is formed of a material that is excellent in electrical insulation and thermal insulation (e.g., silicon or the like). In the case where the sheet member 56 serves as a cushion, it is possible to provide an effect that external shock can be absorbed or reduced. Also, it is possible to reduce the clearance between the battery holder and the bottom of the casing.

(Attachment Protruding Portion 37)

The attachment protruding portion 37 is movably accommodated in the casing 31, and is partially exposed from the casing 31, as shown in FIGS. 1 to 8. An operating portion and the lock hook 37b are formed on the upper and lower sides of the attachment protruding portion 37, respectively, as viewed when the battery pack is mounted to the charger. The lock hook 37b includes an inclined surface and a vertical surface. The inclined surface is faced toward the advancing direction of the battery pack 30 when the battery pack 30 is mounted. The vertical surface borders on the inclined surface. The lock hook 37b is formed integrally with the operating portion by molding. An attachment portion 2 includes a holding recessed portion 17 that is formed at a position corresponding to the lock hook 37b. The holding recessed portion 17 also includes a recessed portion inclined surface corresponding to the inclined surface, and a recessed portion vertical surface corresponding to the vertical surface.

Figure 24:
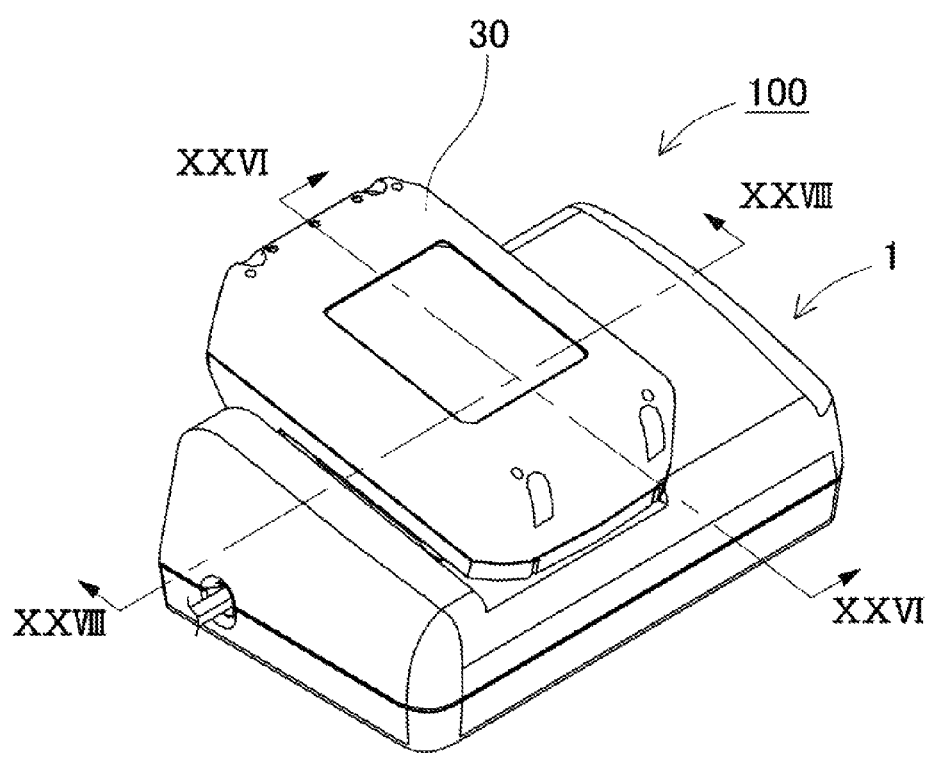
FIG. 24 is a perspective view showing the battery pack and a battery pack charger with the battery pack being mounted to the battery pack charger.
Figure 25:
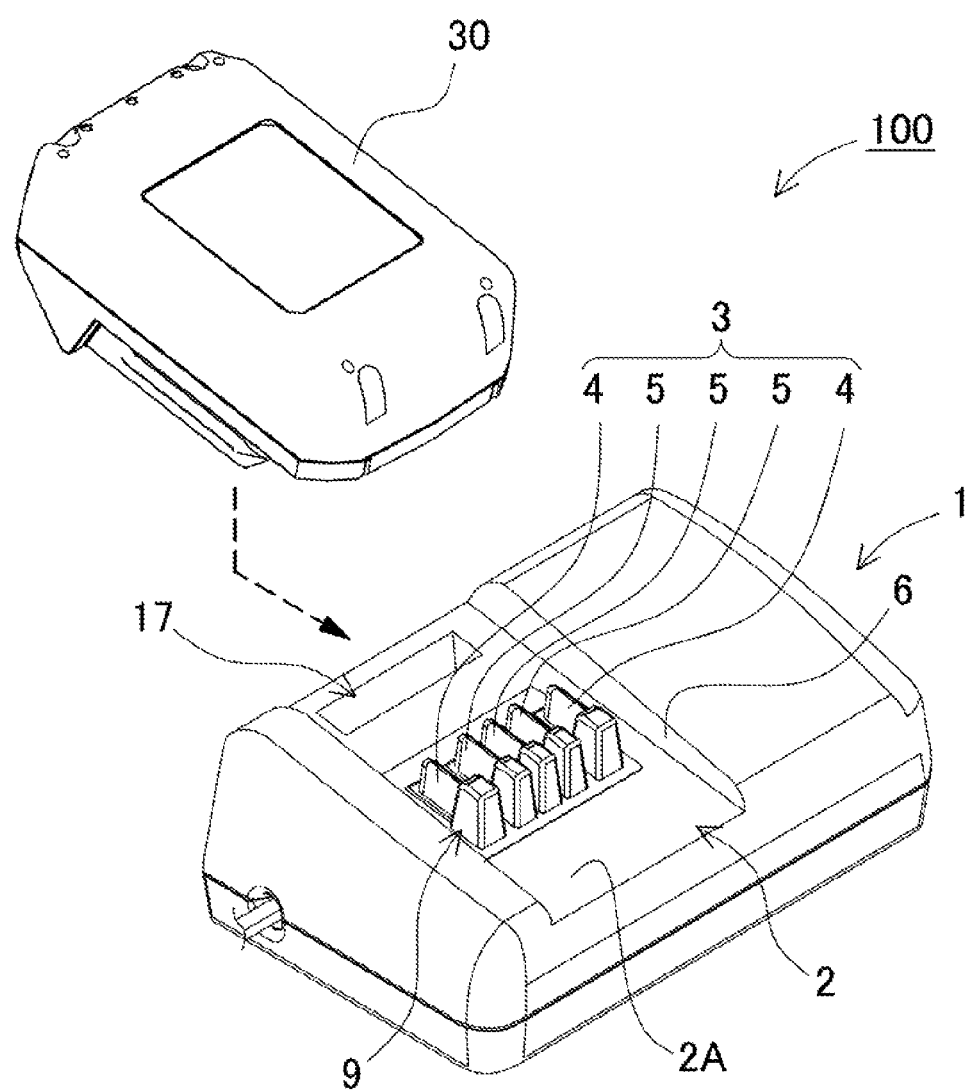
FIG. 25 is a perspective view showing the battery pack and the battery pack charger shown in FIG. 24 with the battery pack being removed from the battery pack charger.
Figure 26:
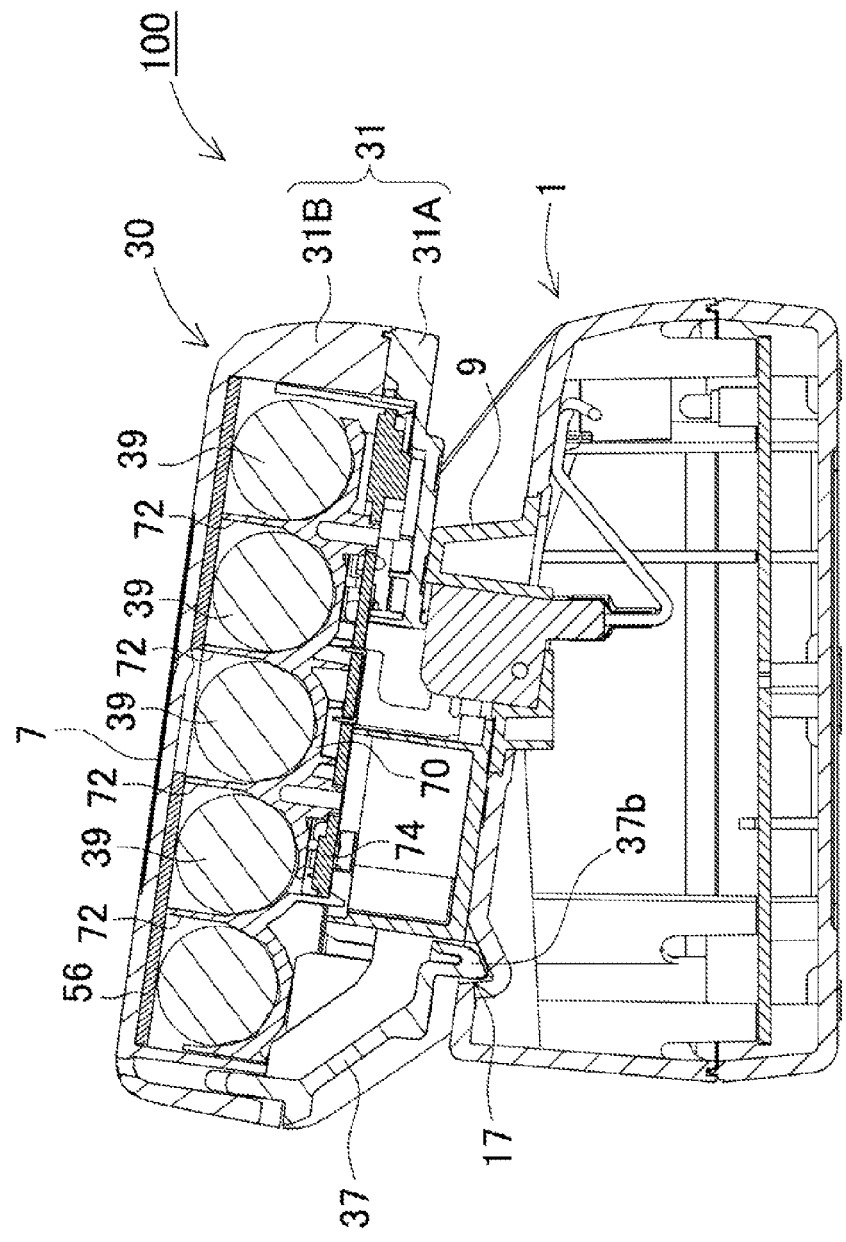
FIG. 26 is a vertical cross-sectional view showing the battery pack charger shown in FIG. 24 taken along the line XXVI-XXVI.
Figure 27:
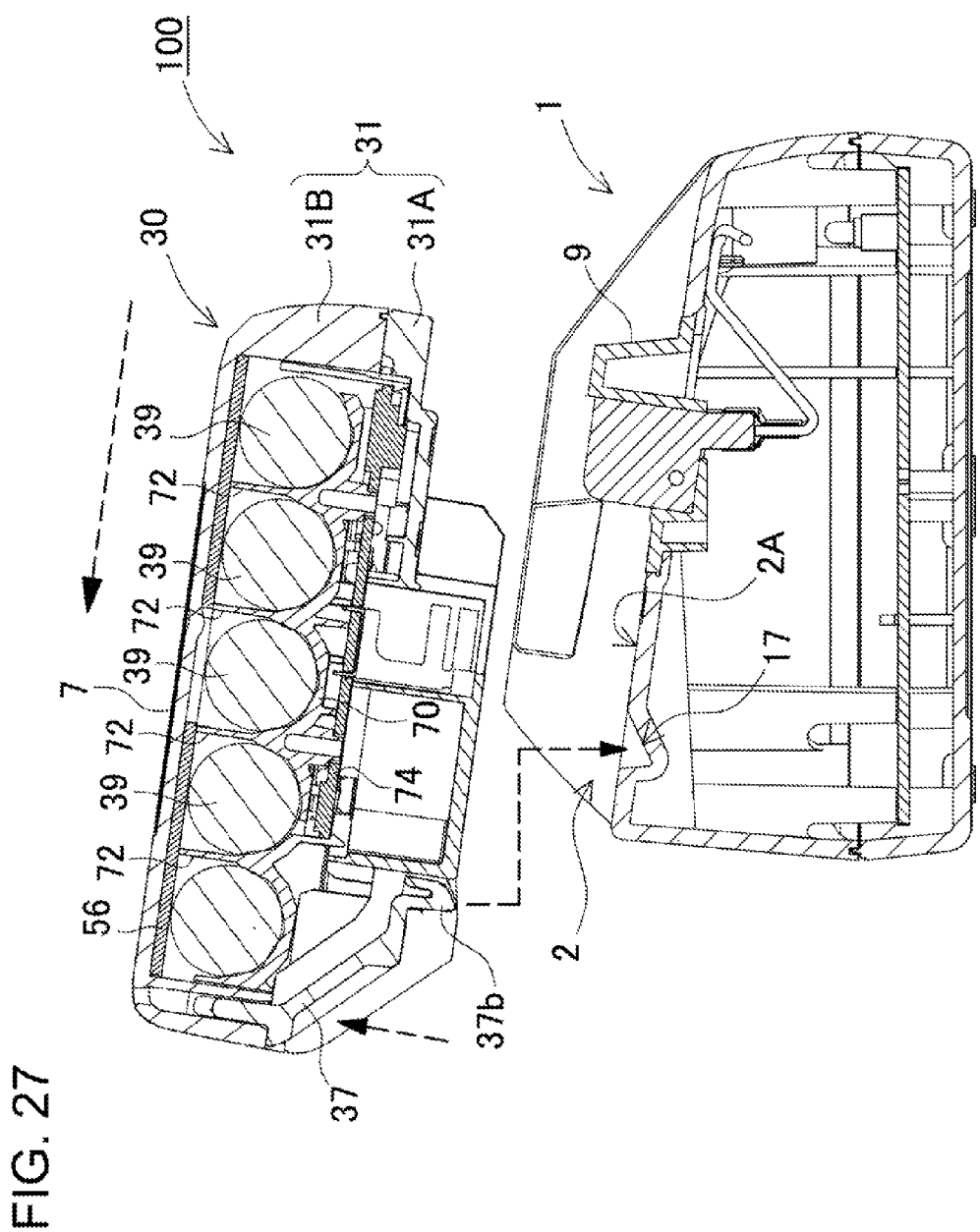
FIG. 27 is a vertical cross-sectional view showing the battery pack and the battery pack charger shown in FIG. 26 with the battery pack being removed from the battery pack charger.
Figure 28:
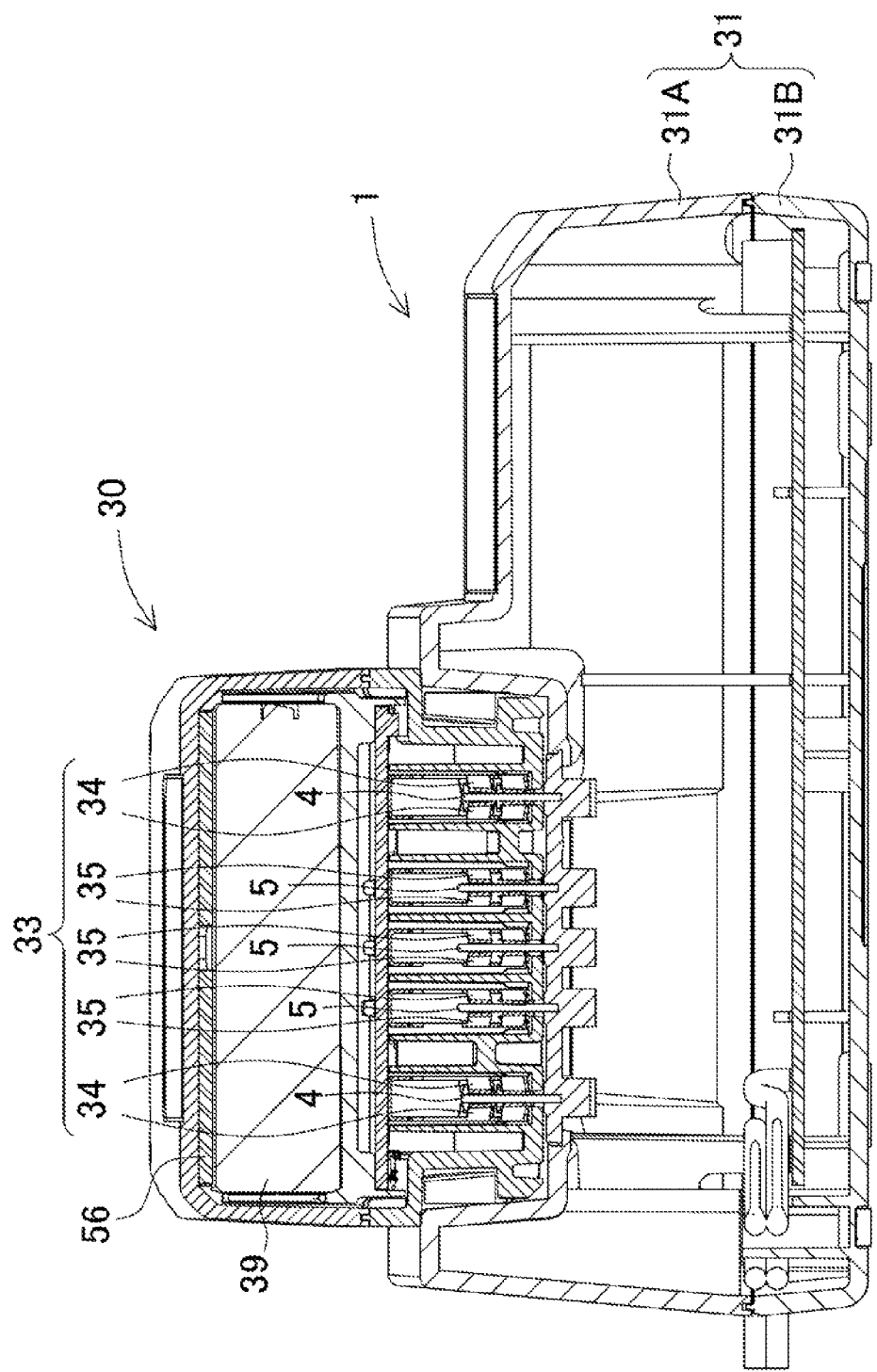
FIG. 28 is a horizontal cross-sectional view showing the battery pack and the charger shown in FIG. 24 taken along the line XXVIII-XXVIII.

FIGS. 24 to 28 show the battery pack 30 and the battery pack charger 100, which is specially designed for charging the battery pack 30, when the battery pack 30 is mounted to the battery pack charger 100. FIG. 24 is a perspective view showing the battery pack 30 and the battery pack charger 100 with the battery pack 30 being mounted to the battery pack charger 100. FIG. 25 is a perspective view showing the battery pack 30 and the battery pack charger 100 shown in FIG. 24 with the battery pack 30 being removed from the battery pack charger 100. FIG. 26 is a vertical cross-sectional view showing the battery pack 30 and the battery pack charger 100 with the battery pack 30 being removed from the battery pack charger 100 taken along the line XXVI-XXVI line in FIG. 24. FIG. 27 is a vertical cross-sectional view showing the battery pack 30 and the battery pack charger 100 shown in FIG. 26 with the battery pack 30 being removed from the battery pack charger 100. FIG. 28 is a transverse cross-sectional view showing the battery pack 30 and the battery pack charger 100 taken along the line XXVIII-XXVIII line in FIG. 24. As shown in these figures, the lock hook 37b is biases downward, in other words, toward the protruding direction, by an elastic member such as a coil spring. When the battery pack 30 is mounted to the attachment portion 2, the inclined portion of the lock hook 37b is pressed so that the lock hook 37b is retracted into the battery pack 30. Thus, the battery pack 30 can be moved in the advancing direction. When the battery pack 30 is moved to a predetermined position, the lock hook 37b protrudes into the holding recessed portion 17 formed corresponding to this position. Also, the lock hook 37b is pressed by the elastic member so that the vertical surface contacts the recessed portion vertical surface. Thus, the lock hook 37b engages with the holding recessed portion 17. After that, even if force is applied to the battery pack 30 in a direction to remove the battery pack 30 from the attachment portion 2, since the vertical surface contacts the recessed portion vertical surface, the lock hook is kept in engagement with the holding recessed portion. Thus, the battery pack 30 is prevented from sliding. When removing the battery pack 30 from the battery pack charger 100, a user pushes up the operating portion of the attachment protruding portion 37 with their hand so that the lock hook 37b disengages from the holding recessed portion 17. Thus, the battery pack 30 can slide. As a result, the battery pack 30 can be removed from the battery pack charger 100. When the battery pack 30 is pushed into the attachment portion 2 as far as it will go (in other words, when the battery pack 30 is pushed to the far-side end of the attachment portion 2), the external connection terminals 33 of the battery pack 30 come into contact with blade-shaped metal connection terminals 3 of the battery pack charger 100, and the attachment protruding portion 37 engages with the holding recessed portion 17. Thus, the battery pack 30 is mounted to the battery pack charger 100. Needless to say, in addition to the function of mounting the battery pack to the charger, the lock hook can also serve to hold the battery pack to the electric equipment.

(Charging/Discharging Terminal 34, Signal Terminal 35, External Connection Terminal 33)

The battery pack 30 includes external connection terminals 33 to be connected to the electric equipment or the battery pack charger 100, as discussed above. For example, when the battery pack 30 is mounted to the battery pack charger 100, the external connection terminals 33 are connected to the connection terminals 3, which are arranged in the attachment portion 2 of the battery pack charger 100. The external connection terminals 33 are arranged in a mount surface 32, which is the bottom surface of the battery pack 30 to be opposed to the bottom surface 2A of the attachment portion 2 when the battery pack 30 is mounted to the attachment portion 2 of the battery pack charger 100 (see FIG. 1 or the like). A stepped portion 36 is formed on the bottom of the casing 31 of the illustrated battery pack 30. Protection portions 9 are arranged on the far-side of the connection terminals 3, which protrude from the attachment portion 2 of the battery pack charger 100. The protection portions 9 are guided to the stepped portion 36. Thus, the battery pack 30 is mounted at a predetermined position on the attachment portion 2.

In the battery pack 30 shown in FIGS. 1 to 7, the slots 38 are formed in parallel to each other in the mount surface 32. The slots 38 accommodate the external connection terminals 33 as elastic contacts. The external connection terminals 33 sandwich the plate-shaped connection terminals 3 of the battery pack charger 100 when inserted into the slots 38 with both sides of the connection terminal 3 being elastically pressed by the external connection terminal 33. Thus, the external connection terminals 33 are electrically connected to the plate-shaped connection terminals 33. The illustrated external connection terminals 33 include the charging/discharging terminals 34 arranged on the sides of the external connection terminal arrangement, and the signal terminals 35 arranged between the charging/discharging terminals 34. The charging/discharging terminals 34 in both sides are connected to the charging terminals 4 of the battery pack charger 100. The signal terminals 35 between the charging/discharging terminals 34 are connected to non-charging terminals 5 as signal terminals of the battery pack charger 100. The signal terminals 35 transmit information on the rechargeable batteries 39 included in the battery pack 30 to external devices. The signal terminals 35 can serve to transmit an abnormal signal (e.g., overcharge signal, overdischarge signal, etc.), a temperature signal, an identification signal and the like of the rechargeable batteries 39 included in the battery pack 30. In this embodiment, the charging/discharging terminals 34, and the signal terminals 35 are commonly designed. As a result, it is possible to simplify the manufacturing process of the five external connection terminals 33. Each of the charging/discharging terminals 34 of the battery pack 30 includes two elastic contact parts, which are aligned in the insertion direction. Thus, the charging/discharging terminals 34 can be properly connected to the blade-shaped metal plate terminals of the electric equipment such as an electric tool to which the battery pack 30 is mounted.

The signal terminals 35 of the battery pack 30 include elastic contacts. The signal terminal can have two elastic contacts, which are aligned in the insertion direction as illustrated. In the case where the two elastic contacts are included, the pack circuit board 74 can provide different signals to the elastic contacts. In electric equipment such as an electric tool to which the battery pack 30 is mounted, in the case where the blade-shaped metal plate terminal is long enough to be connected to both of the elastic contacts, this electric equipment can receive both the different signals or the signal of the far-side one of the elastic contacts. On the other hand, in electric equipment such as an electric tool to which the battery pack 30 is mounted, in the case where the blade-shaped metal plate terminal is so short to be connected only to the closer-side one of the elastic contacts, this electric equipment can receive the signal of this closer-side one of the elastic contacts.

(Charging Circuit 20)

The battery pack charger 100 includes a charging circuit 20 that charges the battery pack 30 mounted to the attachment portion 2. The blade-shaped metal connection terminals 3 of the battery pack charger 100 include the charging terminals 4 and the non-charging terminals 5. Again, the positive/negative blade-shaped metal plate charging terminals 4 are arranged on both sides of the terminal arrangement of the battery pack charger 100. The positive/negative blade-shaped metal plate charging terminals 4 are connected to the positive/negative charging/discharging terminals 34 of the battery pack 30 mounted to the attachment portion 2 so that charging power is supplied to the battery pack 30. The positive charging terminal 4 is connected to the charging circuit 20, as shown in a circuit diagram of FIG. 29. Thus, the rechargeable batteries 39 included in the battery pack 30 are supplied with electric power, and are charged. The illustrated battery pack charger 100 converts alternating current supplied from commercial power (not shown) into direct current using the rectifying circuit 22. The battery pack charger 100 transforms the voltage of this direct current to the charging voltage using the charging circuit 20. Thus, the battery pack charger 100 provides the transformed voltage through the charging terminal 4. The charging circuit 20 changes the duty ratio that controls ON/OFF of a switching element (not shown) that is connected between the output side of the rectifying circuit 22 and the positive charging terminal 4. Thus, the charging circuit 20 adjusts power supplied to the battery pack to the optimum charging voltages and charging current to charge the battery pack 30.

Arranged between the pair of charging terminals 4 are the blade-shaped metal plate non-charging terminal 5 as signal terminals. In the circuit diagram of FIG. 29, two signal terminals are illustratively shown as the connection terminals 3. These signal terminals are the abnormal signal terminal, the temperature signal terminal, and the identifying signal terminal. The abnormal signal relating to the rechargeable batteries 39 included in the battery pack 30 can be transmitted through the abnormal signal terminal. The temperature signal relating to the temperature of the rechargeable batteries 39 included in the battery pack 30 can be transmitted through the temperature signal terminal. The identifying signal relating to the rechargeable batteries 39 included in the battery pack 30 can be transmitted through the identifying signal terminal. However, the signal terminals can be a signal terminal which transmits a signal other than these types of signals relating to various types of battery data such as the charged state of the batteries.

When the abnormal signal is transmitted to the abnormal signal terminal, a control circuit 21 determines that the battery pack 30 is brought into an abnormal state, and turns the charging circuit 20 OFF so that the battery pack 30 stops being charged. The control circuit 21 detects the temperature of the rechargeable batteries 39 included in the battery pack 30 based on the temperature signal provided to the control circuit 21 through the temperature signal terminal. If battery temperature gets higher than the maximum allowable temperature, the control circuit 21 cuts off the charging current and stops charging the battery pack, or reduces the charging current so that the battery temperature decreases. Alternatively, the control circuit can transmit the abnormal signal to the device side or the charger side so that the device side or the charger side cuts off or reduces the charging current. When the battery temperature gets lower than predetermined temperature, the battery pack can be charged again with a normal amount of charging current.

Also, based on the identifying signal relating to the batteries provided through the identifying signal terminal, the control circuit 21 determines the optimum voltage and current values for charging the battery pack 30, and selects proper charge voltage and charging current to be provided from the charging terminal 4. When the battery pack 30 is mounted to this battery pack charger 100, the control circuit 21 receives the identifying signal relating to the batteries provided from a control portion 40 of the battery pack 30. The control circuit 21 determines the type of the battery pack 30 based on the provided identifying signal relating to the batteries. Thus, the optimum voltage and current values for charging the battery pack 30 are applied to the battery pack 30 by the charging circuit 20 under control of the control circuit 21. This battery pack charger 100 selects proper charging voltage and charging current values for charging the battery pack 30 based on the identifying signal relating to the batteries provided from the battery pack 30, and selectively applies the optimum voltage to the batteries. Accordingly, a plurality of types of battery packs can be charged by this single battery pack charger. However, the battery pack charger does not necessarily switch output voltage from one to another. The battery pack charger may apply fixed output voltage when charging the battery pack.

Figure 29:
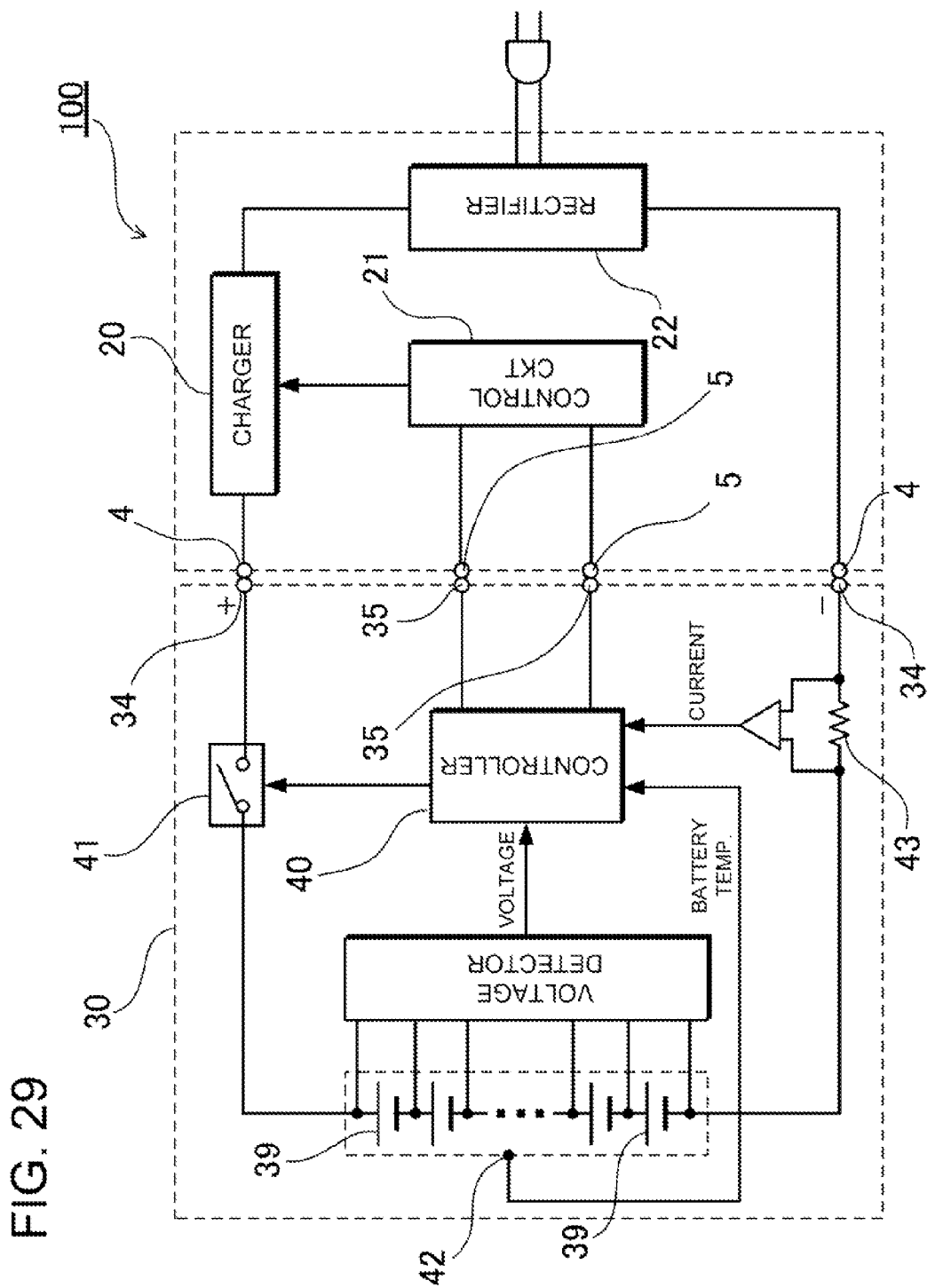
FIG. 29 is a circuit diagram showing the battery pack and the battery pack charger with the battery pack being connected to the battery pack charger.
Figure 30:
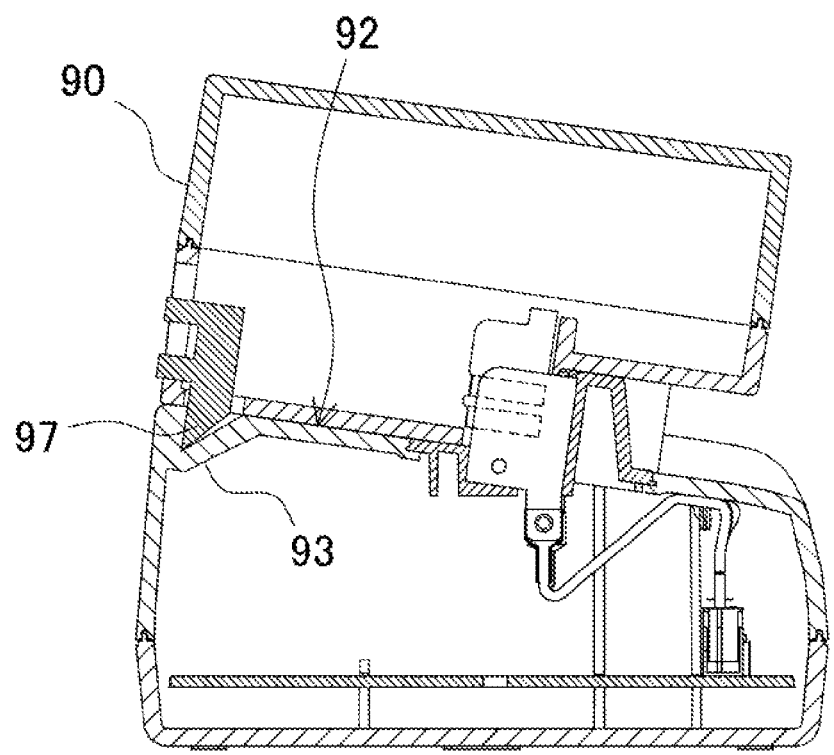
FIG. 30 is a schematic view showing a lock structure that mounts a battery pack to a charger.

Also, the pack battery 30 shown in FIG. 29 includes a charging/discharging switch 41, and the control portion 40. The charging/discharging switch 41 is serially connected to the rechargeable batteries 39. The control portion 40 turns the charging/discharging switch 41 OFF if an abnormality of the batteries 39 is detected. The charging/discharging switch 41 is switched from ON to OFF, if the battery gets fully charged, so that the battery is prevented from being overcharged. Also, the charging/discharging switch 41 is turned OFF, if the battery will be fully discharged, so that the battery is prevented from being over-discharged.

Alternatively, the charging/discharging switch 41 may be omitted. In this case, the pack battery can transmit the abnormal signal to the device side or charger side so that the device side or charger side can cut off or reduce the charging current.

The control portion 40 detects the current flowing in the batteries 39 or the voltage of the batteries 39, and calculates the remaining capacity of the batteries. In order to detect the current of the batteries, the pack battery includes a current sensing resistor 43 that is serially connected to the batteries. The voltage between the ends of the current sensing resistor 43 is detected. Thus, the current flowing in the batteries is detected based on the detected voltage. In this detection, the charging current and discharging current flowing in the batteries are distinguished from each other. Also, the control portion 40 detects over current in the batteries 39, or abnormal temperature of the batteries 39. If detecting over current or abnormal temperature, the control portion 40 turns the charging/discharging switch 41 OFF so that the current is cut off. Also, if detecting the abnormality of the batteries 39 included in the battery pack, the control portion 40 transmits the abnormal signal to the external device through the communication terminals 35.

The illustrated pack battery includes a temperature sensor 42 that detects the battery temperature. The temperature sensor 42 is a thermistor, which is arranged close to the batteries 39 and is the thermally coupled to the batteries 39. This temperature sensor has variable electric resistance in accordance with the temperature of the batteries 39. Thus, the battery temperature can be detected. If the battery temperature detected by the temperature sensor 42 gets higher than a predetermined temperature, the control portion 40 turns the charging/discharging switch 41 OFF so that the battery pack stops being charged/discharged. In addition, the control portion transmits a signal that indicates abnormal high battery temperature through the communication terminal 35. Alternatively, information on the battery temperature can be transmitted through the communication terminal 35.

The battery pack according to the present invention can be suitably used as an electric tool battery pack, and battery packs for mobile devices such as a power-assisted bicycle, an electric motorcycle, a mobile phone, and the like.

It should be apparent to those of ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims.

The present application is based on Application No. 2010-184809 filed in Japan on Aug. 20, 2010, the content of which is incorporated herein by reference.

What is claimed is:

1. A battery pack that can be attached to electric equipment to be supplied with electric power and can be attached to a charger for charging the battery pack, the battery pack comprising:
    a plurality of rechargeable batteries for supplying electric power to the electric equipment;
    a battery holder that holds the rechargeable batteries;
    a pack circuit board that includes an electronic circuit connected to said rechargeable batteries;
    a casing that accommodates said battery holder and said pack circuit board;
    external connection terminals that are fastened onto said pack circuit board and are connected to said rechargeable batteries, the external connection terminals being exposed externally of said casing; and
    a lock hook that protrudes from a surface of said casing, and holds the battery pack with the battery pack being attached to the battery charger and/or the electric equipment,
    wherein a hook opening window is opened in the surface of said casing so that said lock hook can protrude from the surface of said casing,
    wherein said casing comprises a partition rib formed integrally with said casing and extending inwardly from a periphery of said hook opening window so as to surround said hook opening window, and
    wherein an inner edge of said partition rib contacts said pack circuit board.

2. The battery pack according to claim 1, further comprising terminal ribs that extends inside said casing to enclose said external connection terminals, respectively, wherein edges of said external connection terminals contact said pack circuit board.

3. The battery pack according to claim 2, wherein the edges of said terminal ribs partially contact surfaces of said external connection terminals, respectively,
    wherein at least one of said external connection terminals has a soldering part that is arranged for wiring in proximity to the contact part of said external connection terminal with said respective terminal rib, wherein a protruding stopper portion is formed on a surface of the external connection terminal at an edge of the soldering part.

4. The battery pack according to claim 3, wherein said protruding stopper portion is formed on the surface of said external connection terminal by drawing.

5. The battery pack according to claim 1, further comprising a plurality of holding rib portions inside said casing,
    wherein the holding rib portions guide upper parts of said external connection terminals, and hold the upper parts of said external connection terminals, respectively,
    wherein each of the holding rib portions holds the upper part of said respective external connection terminal from both sides of said external connection terminal.

6. The battery pack according to claim 5, wherein each of said holding rib portions sandwiches the upper part of said respective external connection terminal.

7. The battery pack according to claim 5, wherein the holding rib portions are formed on an inner surface of the case, and the holding rib portions are arranged on inner surfaces of the terminal ribs.

8. A battery pack that can be attached to a charger for charging the battery pack, the battery pack comprising:
    a plurality of rechargeable batteries;
    a battery holder that holds the rechargeable batteries;
    a pack circuit board that includes an electronic circuit connected to said rechargeable batteries;
    a casing that accommodates said battery holder and said pack circuit board;
    external connection terminals that are fastened onto said pack circuit board and are connected to said rechargeable batteries, the external connection terminals being exposed externally of said casing;
    an attachment protruding portion movably accommodated in said casing and partially exposed from said casing; and
    a lock hook provided on said attachment protruding portion and protruding from a surface of said casing, said lock hook holds the battery pack with the battery pack being attached to the charger,
        wherein a hook opening window is opened in the surf surface of said casing so that said lock hook can movably protrude therethrough,
        wherein a drain hole is opened in another surface of said casing other than the surface in which said hook opening window is opened,
        wherein a partition rib is arranged between a communication path and the electronic circuit so that the path is separated from the electronic circuit, wherein the communication path extends inside said casing from said hook opening window and communicates with said hook opening window, and the electronic circuit is mounted on said pack circuit board, and
        wherein said hook opening window communicates with the drain hole through the communication path, which is formed by said partition rib.

9. The battery pack according to claim 8, wherein said communication path is formed at least partially on an upper surface of said battery holder.

10. The battery pack according to claim 9, wherein the upper surface of said battery holder is inclined at a downward angle toward said drain hole.

11. A battery pack that can be attached to electric equipment to be supplied with electric power and can be attached to a charger for charging the battery pack, the battery pack comprising:
    a plurality of rechargeable batteries for supplying electric power to the electric equipment;
    a battery holder that holds said rechargeable batteries;
    a pack circuit board that includes an electronic circuit connected to said rechargeable batteries;
    a casing that accommodates said battery holder and said pack circuit board;
    external connection terminals that are fastened onto said pack circuit board and are connected to said rechargeable batteries, the external connection terminals being exposed externally of said casing;

a lock hook that protrudes from a surface of said casing, and holds the battery pack with the battery pack being attached to the charger and/or the electric equipment, and terminal ribs that extend inside said casing to enclose said external connection terminals, wherein a hook opening window is opened in a surface of said casing so that said lock hook can protrude from the surface of said casing, wherein a partition rib extends inside said casing along the hook opening window for said lock hook, wherein an edge of said partition rib contacts said pack circuit board, wherein edges of said external connection terminals contact said pack circuit board, wherein edges of said terminal ribs partially contact surfaces of said external connection terminals, wherein at least one of said external connection terminals has a soldering part that is arranged for wiring in proximity to the contacting part of said external connection terminal with said terminal rib, and wherein a protruding stopper portion is provided at an edge of the soldering part.

12. The battery pack according to claim 11, further comprising holding rib portions arranged inside of said casing, wherein each of said external connection terminals is formed in a U-shape, and the edges of said external connection terminals are disposed substantially in parallel, and wherein said holding rib portions hold the edges of said external connection terminals by sandwiching both sides of the edges of said external connection terminals, respectively.

13. The battery pack according to claim 12, wherein the holding rib portions are formed on an inner surface of the case, and the holding rib portions are arranged on inner surfaces of the terminal ribs.

* * * * *